United States Patent
Aliakbar Tabrizi et al.

(10) Patent No.: US 10,540,399 B2
(45) Date of Patent: Jan. 21, 2020

(54) METHOD AND SYSTEM FOR INFORMATION RETRIEVAL

(71) Applicants: Shayan Aliakbar Tabrizi, Tehran (IR); Azadeh Shakery, Tehran (IR); MohammadAli Tavallaei, Tehran (IR); Javid Dadashkarimi, Bonab (IR)

(72) Inventors: Shayan Aliakbar Tabrizi, Tehran (IR); Azadeh Shakery, Tehran (IR); MohammadAli Tavallaei, Tehran (IR); Javid Dadashkarimi, Bonab (IR)

(73) Assignee: SHAYAN ALIAKBAR TABRIZI, Tehran (IR)

( * ) Notice: Subject to any disclaimer, the term of this patent is extended or adjusted under 35 U.S.C. 154(b) by 210 days.

(21) Appl. No.: 15/675,509

(22) Filed: Aug. 11, 2017

(65) Prior Publication Data
US 2017/0344663 A1    Nov. 30, 2017

Related U.S. Application Data

(60) Provisional application No. 62/373,378, filed on Aug. 11, 2016.

(51) Int. Cl.
*G06F 17/30* (2006.01)
*G06F 16/903* (2019.01)

(52) U.S. Cl.
CPC ................................. *G06F 16/903* (2019.01)

(58) Field of Classification Search
CPC ........................................................ G06F 16/00
See application file for complete search history.

(56) References Cited

U.S. PATENT DOCUMENTS

| | | | | |
|---|---|---|---|---|
| 8,103,659 B1 * | 1/2012 | Spiegel | | G06F 16/9535 707/722 |
| 8,412,698 B1 * | 4/2013 | Sarukkai | | G06F 16/9535 707/713 |
| 8,886,644 B1 | 11/2014 | Stracke, Jr. | | |
| 2002/0078045 A1 * | 6/2002 | Dutta | | G06F 16/951 707/999.007 |
| 2005/0278317 A1 | 12/2005 | Gross | | |
| 2008/0103907 A1 | 5/2008 | Maislos et al. | | |
| 2009/0164929 A1 | 6/2009 | Chen et al. | | |
| 2011/0320441 A1 | 12/2011 | Lee et al. | | |
| 2012/0323876 A1 * | 12/2012 | Lymberopoulos | | G06F 16/9535 707/706 |

OTHER PUBLICATIONS

Wei Zheng, A Retrieval System based on Sentiment Analysis, HCIR 2010, vol. 52.
Ori Ben-Yitzhak, Beyond basic faceted search., Proceedings of the 2008 International Conference on Web Search and Data Mining. ACM, 2008.

(Continued)

*Primary Examiner* — Khanh B Pham
(74) *Attorney, Agent, or Firm* — NovoTechIP International PLLC

(57) ABSTRACT

A perspective-based search system and method is disclosed. The perspective based system allows users to select specific perspectives on a search topic and view the results from those perspectives. In addition, perspective-based searching allows users to more easily infer their own search intents with greater clarity, and without complex or multiple queries.

20 Claims, 17 Drawing Sheets

(56) References Cited

OTHER PUBLICATIONS

Miller Mcpherson, Birds of a feather: Homophily in social networks, Annual review of sociology, 2001, vol. 27, Issue 1, pp. 415-444.
Cass R. Sunstein, Echo chambers: Bush v. Gore, impeachment, and beyond, Princeton, NJ: Princeton University Press, 2001.
Luis Von Ahn, Games with a purpose, Computer, 2006, vol. 39, Issue 6, pp. 92-94.
Amna Dridi, Information retrieval framework based on social document profile., CEUR, 2014.
Zhongming Ma, Interest-based personalized search, ACM Transactions on Information Systems (TOIS), vol. 25, Issue 1, p. 5. 2007.
Jonathan Koren, Personalized interactive faceted search., Proceedings of the 17th international conference on World Wide Web. ACM, 2008.
Fang Liu, Personalized web search for improving retrieval effectiveness, IEEE Transactions on knowledge and data engineering, 2004, vol. 16, Issue 1, pp. 28-40.
Jaime Teevan, Personalizing search via automated analysis of interests and activities., Proceedings of the 28th annual international ACM SIGIR conference on Research and development in information retrieval. ACM, 2005.
Elad Yom-Tov, Promoting civil discourse through search engine diversity., Social Science Computer Review, 2014, vol. 32, Issue 2, pp. 145-154.
R. Kelly Garrett, Resisting political fragmentation on the Internet, Daedalus, 2011, vol. 140, Issue 4, pp. 108-120.
David O. Sears, Selective exposure to information: A critical review., Public Opinion Quarterly, 1967, vol. 31, Issue 2, pp. 194-213.
Liang Gou, SNDocRank: document ranking based on social networks., Proceedings of the 19th international conference on World wide web. ACM, 2010.
Rishabh Mehrotra, Terms, topics & tasks: Enhanced user modelling for better personalization., Proceedings of the 2015 International Conference on the Theory of Information Retrieval. ACM, 2015.
Sergey Brin, Reprint of: The anatomy of a large-scale hypertextual web search engine., Computer networks, 2012, vol. 56, Issue 18, pp. 3825-3833.

* cited by examiner

FIG. 15

METHOD AND SYSTEM FOR INFORMATION RETRIEVAL

CROSS-REFERENCE TO RELATED APPLICATION

This application claims the benefit of priority from U.S. Provisional Patent Application Ser. No. 62/373,378, filed on Aug. 11, 2016, and entitled "PERSPECTIVE-BASED SEARCH (PBS)," which is incorporated herein by reference in its entirety.

BACKGROUND

Information retrieval (IR) is the activity of obtaining information resources relevant to an information need from a collection of information resources (e.g., web pages, images, text documents, multimedia content). Searches can be based on full-text or other content-based indexing. IR can be understood to comprise the science of searching for information in a document, searching for documents themselves, as well as searching for metadata that describe data, and for databases of texts, images or sounds. Automated IR systems such as web-based search engines are one of the most visible IR applications.

One paradigm in IR is personalization, which refers to search experiences that are tailored specifically to an individual's interests by incorporating information about the individual beyond the specific query provided. However, such personalized searches have been known to bias the results towards the interests of the searching user according to information available regarding the user and/or the user's preferences.

SUMMARY

This Summary is provided to introduce a selection of concepts in a simplified form that are further described below in the Detailed Description. This Summary is not intended to identify key features or essential features of the claimed subject matter, nor is it intended to be used, to limit the scope of the claimed, subject matter. Furthermore, the claimed subject matter is not limited to implementations that solve any or all disadvantages noted in any part of this disclosure.

In one general aspect, a system for a perspective based search are disclosed. The system can include one or more computers and one or more storage devices, the one or more storage devices storing instructions that, when executed by the one or more computers, cause the one or more computers to perform a series of operations. These operations can include receiving a first search query from a first client device, receiving, in response to the first search query, search result data identifying a plurality of resources and respective perspective data for each of the plurality of resources, and selecting and ranking, based on the received perspective data, a plurality of perspectives for the first search query. The operations can also include receiving, from the first client device, a selection of a first perspective included in the first plurality of perspectives, selecting first search results in response to the first search query and ranked based at least in part on a calculated relevance for each of the first search results to the selected first perspective, and providing the first search results to the first client device.

The above general aspect may include one or more of the following features. The instructions may further cause the one or more computers to perform operations including receiving crowd-sourced perspective information for one or more of the resources; and generating the respective perspective data for each, of the one or more of the resources based at least in part on the crowd-sourced perspective information. The instructions may further cause the one or more computers to perform operations including determining the first client device is associated with a first user, wherein the selected perspective can at least partially correspond to available background information of the first user. The instructions may further cause the one or more computers to perform operations comprising presenting, before the receiving of the selection of the first perspective, a subset of the plurality of perspectives for the first search query via the client device, wherein the first perspective is selected from the subset of the plurality of perspectives.

The instructions may further cause the one or more computers to perform operations including: selecting a second plurality of search results based on the first search result data; and presenting, before the receiving of the selection of the first perspective, the second plurality of search results in combination with the presentation of the subset of the plurality of perspectives. The instructions may further cause the one or more computers to perform operations including: presenting, before the receiving of the selection of the first perspective, a first subset from the plurality of perspectives for the first search query via the first client device; presenting a user interface to be presented on the first client device, the user interface being configured to receive a perspective query term; receiving the perspective query term from the first client device; selecting a second subset from the plurality of perspectives based at least upon the received perspective query term; and presenting the second subset via the first client device, wherein the first perspective is included in the second subset.

The instructions may further cause the one or more computers to perform operations including providing a user interface configured to receive user identifications of one or more perspective associated with a resource. The instructions may further cause the one or more computers to perform operations including: generating a second perspective based at least in part on social media information associated with a social media account; receiving a selection of the second perspective from a second client device; receiving a second search query from the second client device; and selecting second search results in response to the second query and ranked based at least in part on a calculated relevance value for each of the second search results to the second perspective. The instructions may further cause the one or more computers to perform operations including: determining the first client device is associated with a first user. The ranking of the first plurality of perspectives may include prioritizing one or more perspectives previously selected by the first user. The instructions may further cause the one or more computers to perform operations including automatically identifying a second perspective as being related to the first perspective, wherein the ranking of the search results is further based at least in part on a calculated relevance for each of the search results to the identified second perspective.

In another aspect, a method for a perspective based search is also disclosed. The method can include receiving a first search query from a first client device, receiving, in response to the first search query, search result data identifying a plurality of resources and respective perspective data for each of the plurality of resources, and selecting and ranking, based on the received perspective data, a plurality of perspectives for the first search query. The method also includes receiving, from the first client device, a selection of a first perspective included in the first plurality of perspectives, selecting first search results in response to the first search query and ranked based at least in part on a calculated relevance for each of the first search results to the selected first perspective, and providing the first search results to the first client device.

The above general method aspect may include one or more of the following features. The method may further include receiving crowd-sourced perspective information for one or more of the resources; and generating the respective perspective data for each of the one or more of the resources based at least in part on the crowd-sourced perspective information. The method may further include determining the first client device is associated with a first user, wherein the selected perspective can at least partially correspond to available background information of the first user. The method may further include presenting, before the receiving of the selection of the first perspective, a subset of the plurality of perspectives for the first search query via the client device, wherein the first perspective is selected from the subset of the plurality of perspectives.

The method may further include selecting a second plurality of search results based on the first search result data; and presenting, before the receiving of the selection of the first perspective, the second plurality of search results in combination with the presentation of the subset of the plurality of perspectives. The method may further include: presenting, before the receiving of the selection of the first perspective, a first subset from the plurality of perspectives for the first search query via the first client device; presenting a user interface to be presented on the first client device, the user interface being configured to receive a perspective query term; receiving the perspective query term from the first client device; selecting a second subset, from the plurality of perspectives based at least upon the received perspective query term; and presenting the second subset via the first client device, wherein the first perspective is included in the second subset.

The method may further include providing a user interface configured to receive user identifications of one or more perspective associated with a resource. The method may further include: generating a second perspective based at least in part on social media information associated with a social media account; receiving a selection of the second perspective from a second client device; receiving a second search query from the second client device; and selecting second search results in response to the second query and ranked based at least in part on a calculated relevance value for each of the second search results to the second perspective. The method may further include determining the first client device is associated with a first user. The ranking of the first plurality of perspectives may include prioritizing one or more perspectives previously selected by the first user.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 15 illustrates an implementation of a PBS user interface with a web based search PBS user interface;

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following description provides various implementations of an information retrieval method and a system referred to herein as a perspective-based search (PBS) system. In different implementations of the PBS system, different perspectives about a search topic can be presented to the user, allowing the user to choose a desired perspective through which to determine relevancy of search results.

Figure 1:
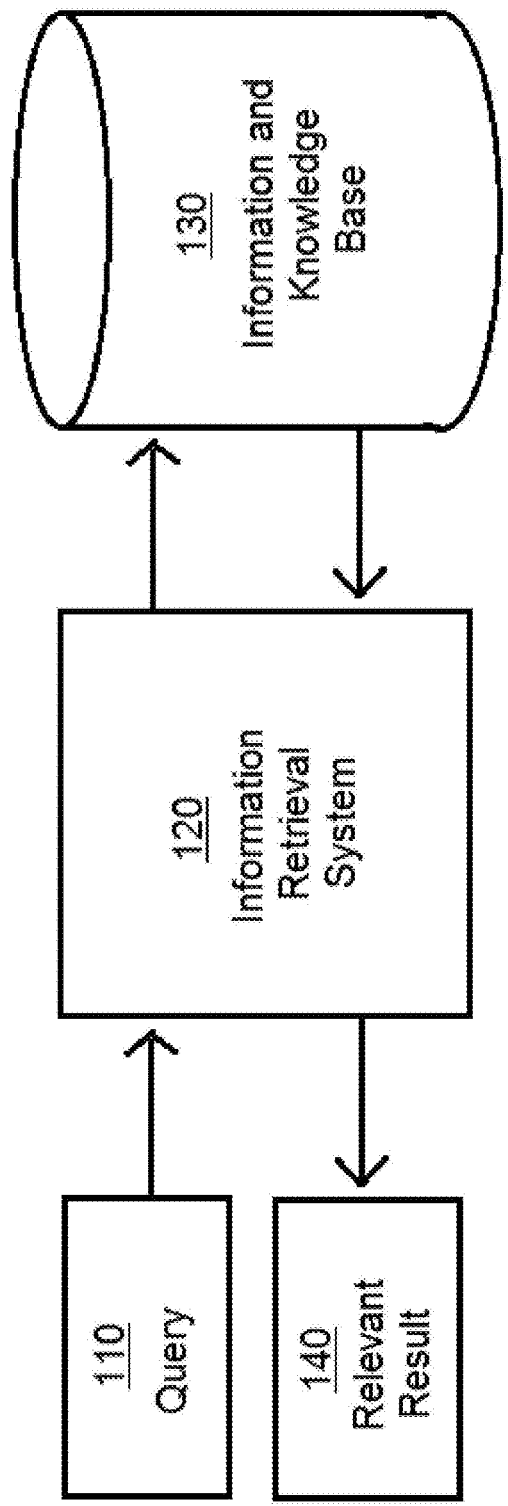
FIG. 1 is a schematic illustration providing an example of a traditional information retrieval system.

For purposes of context, FIG. 1 provides the reader with a schematic example of an overview of a traditional information retrieval system. In such systems, a user may enter a query 110 into an information retrieval system 120. In different implementations, queries can include formal statements of information needs, general topics, media, or other text, for example search strings in web search, engines. The information retrieval system 120 can search through an information and knowledge base 130. During the retrieval, a query may not necessarily identify a single object in the collection. Instead, several objects may match the query, generally with different degrees of relevancy. For purposes of this application, an object is an, entity that is, represented by information in a content collection or other database. Thus, user queries can be matched against the information available in the information and knowledge base 130. In some cases, the information retrieval results returned may or may not directly match the query. During presentation of the results to the user, the results may be ranked based on some factor(s) associated with the information retrieval system 120. Depending on the information available in the information and knowledge base 130, the information retrieval system 120 can then provide a relevant result 140 to the user.

With the emergence of the internet, a global communication and information network, it was commonly believed that a more knowledgeable global society would naturally follow. It was anticipated that the free flow of information could lead to healthier civic discourse and a "borderless" world. Unfortunately, various phenomena associated with the internet have produced a rather different outcome. One such phenomenon is the filter bubble, which refers to concept of user-tailored information systems, such as personalized recommender systems and personalized search engines, typically providing only 'agreeable' information to users. This phenomenon can lead to group polarization and a disconnection from other points of view. A second phenomenon has been referred to as the echo chamber or information cocoon, where, due to cognitive biases such as selective exposure and homophily, individuals have a natural tendency to favor confirmatory information and avoid dissonant information. This can result in an individual being primarily exposed to agreeable information. For purposes of this disclosure, the term information bubble can be understood to refer to both the filter bubble and echo chamber phenomenon.

The information bubble can lead to several disadvantageous results. For example, in groups of like-minded types, people have been identified as being increasingly likely to move toward holding more extreme viewpoints, which can lead to more polarized views of the topic, increasing intolerance to opposing views. In addition, the framework of the information bubble threatens a user's autonomy, where the information system becomes a screen that determines what the user should or should not see. A user may not be aware of what factors the system is applying as it produces such filtered results for the user. These consequences can damage the possibility of healthy civic discourse and open-minded deliberation across society.

Figure 2:
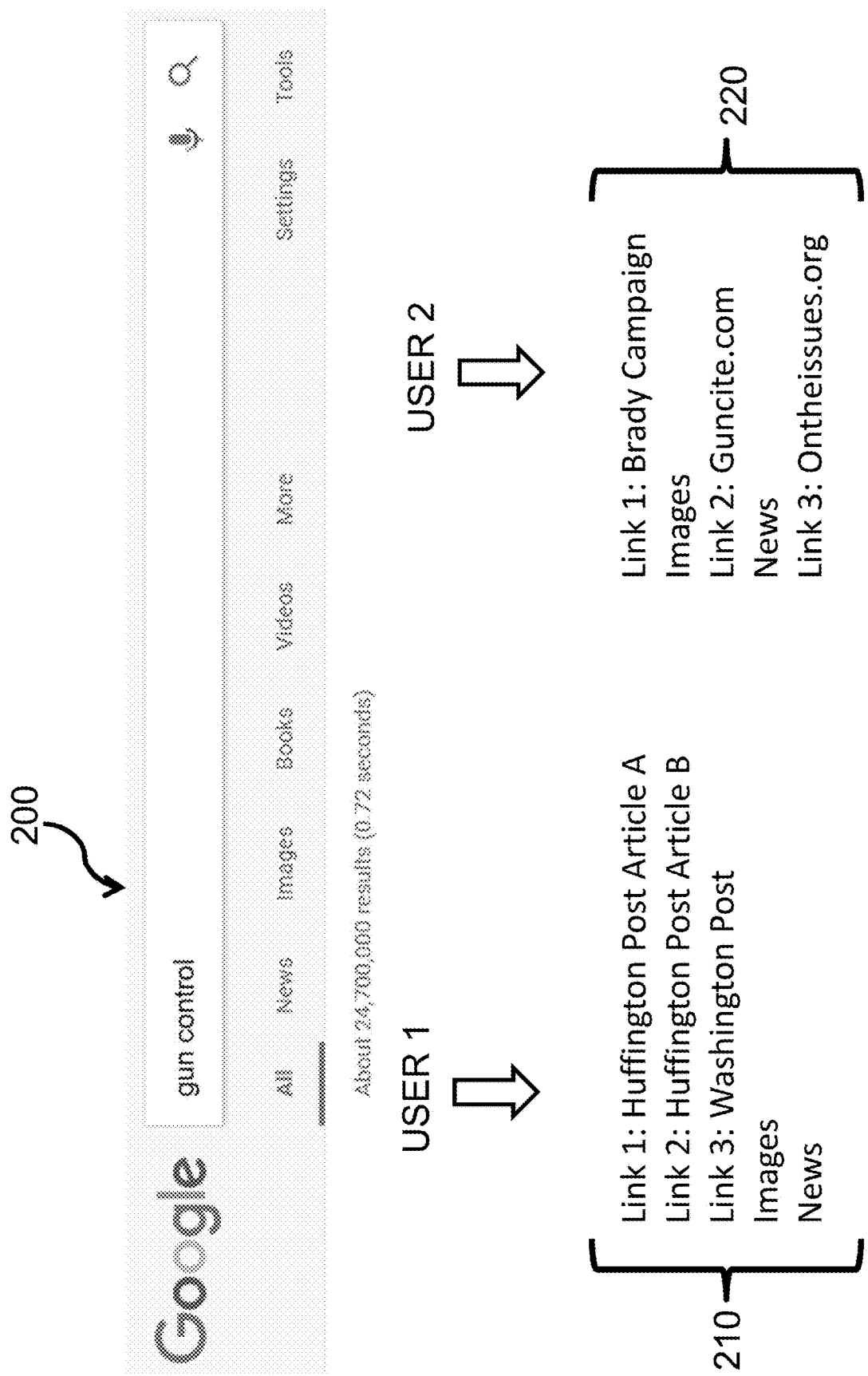
FIG. 2 is a schematic illustration providing an example of the filter bubble concept.

For purposes of clarity, FIG. 2 illustrates a schematic example of the filter bubble concept. In this example, one type of search engine 200 is shown in which a user has entered a query for "gun control." There are many different approaches towards the idea of gun control. Such apparent conflicts in perspectives are prevalent in, many conventional searches. Indeed, current IR paradigms are typically classified as either non-personalized or personalized. In the non-personalized approach, a combination of search results from different perspectives are shown to the user, which may be confusing for a user. Similarly, since users usually view only a few results, the user will probably review only a small portion of different perspectives on that topic, without being aware of other opinions and thoughts on the subject. In the personalized approach, the system categorizes the user in some way and the results provided correspond to this categorization. User information, such as, for example, geographical location, language, and social network connections and profile, biases the results towards the categorized perspective, and the user generally remains unaware of other perspectives.

In FIG. 2, a first user who has been identified by the system as having more 'liberal' tendencies based on social network connections, is provided with a first set of results ("first set") 210. In contrast, a second user who has been identified by the system as having more 'conservative' tendencies based on their social network connections, is provided with a second set of results ("second set") 220. The first set 210 ranks the results such that articles or information containing politically liberal American news and opinions are prioritized. In addition, the second set 220 ranks the results such that articles or information containing politically conservative American news or opinions are prioritized. Thus, for the same search query, two users may receive distinctly different search results.

The PBS paradigm is configured to help overcome these types of bias and provide more fair results to the user. In addition, perspective-based searching allows users to more easily infer their own search intents with greater clarity, and without complex or multiple queries. In one implementation, the PBS system offers a user the choice of possible perspectives, whereby the user determines how the results should be prioritized.

Figure 3:
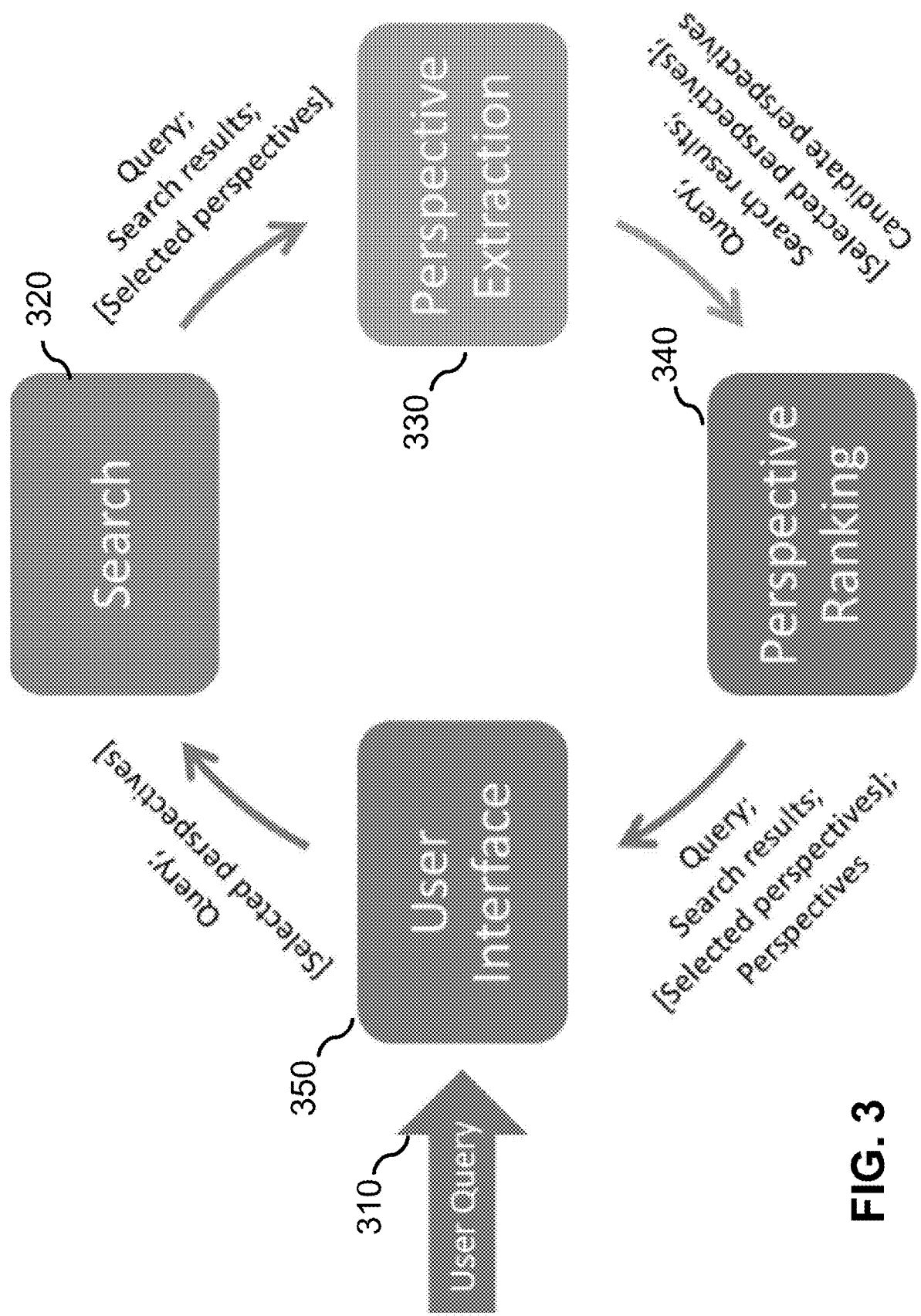
FIG. 3 is a schematic illustration of an implementation of a perspective-based search (PBS) process.
Figure 4:
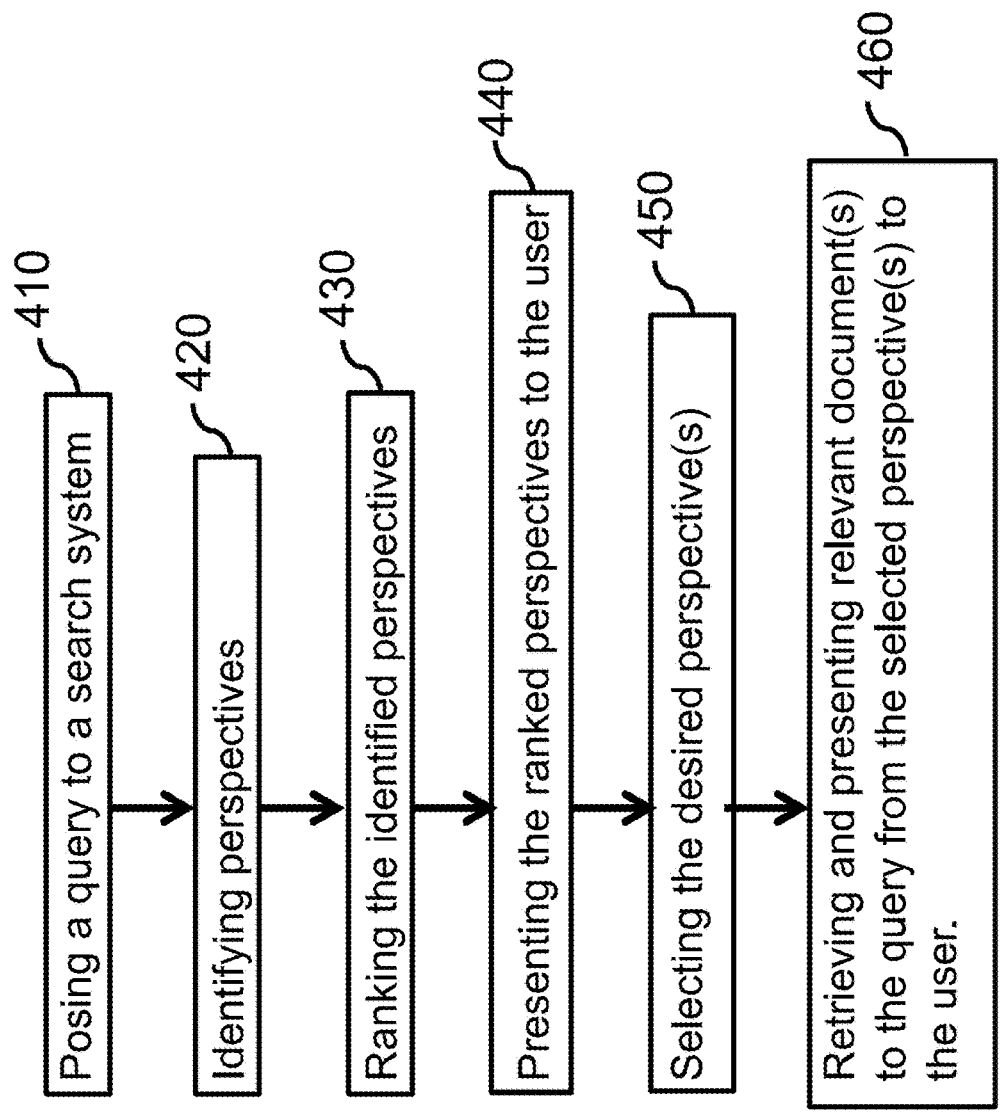
FIG. 4 is a flow chart illustrating an implementation of a PBS process.
Figure 5:
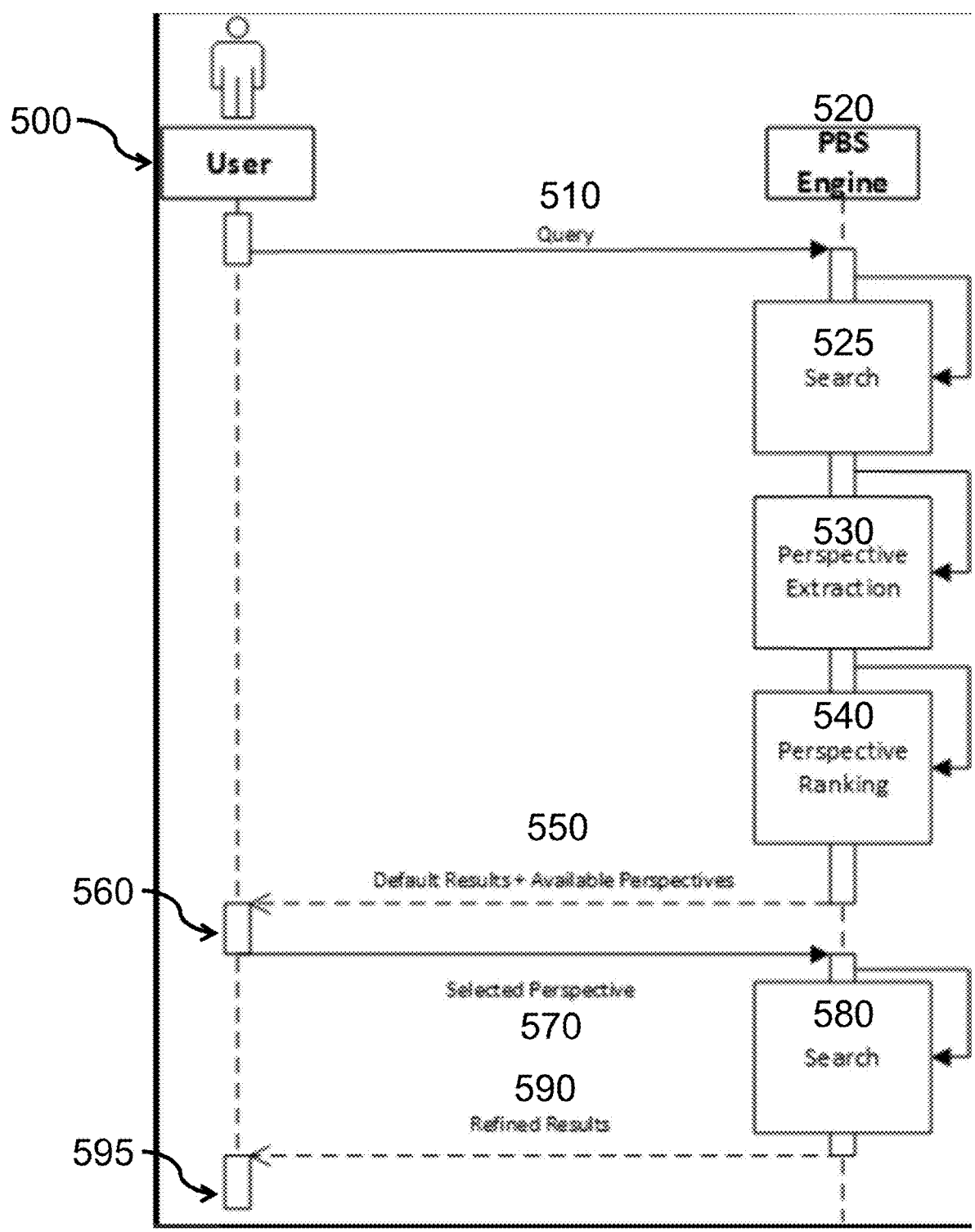
FIG. 5 is a schematic illustration of an implementation of a PBS system.

Referring now to FIGS. 3-5, an overview of the PBS paradigm is presented. In FIG. 3, a high-level schematic of an implementation of a perspective-based search is illustrated. In some implementations, the perspective-based search first involves a user query 310 into a system configured to provide a means of conducting a search 320. The search generates results which are identified as being associated with one or more labels, comprising a perspective extraction 330. The extraction is followed by a perspective ranking 340, which prioritizes some perspective categories over others. These perspectives are presented to the user via a user interface 350 as results of the search 320.

FIG. 4 provides additional details regarding an implementation of the PBS process. FIG. 4 is a flow chart presenting a method for implementing the core components of PBS based on, for example, user-generated content and/or users collaboration, although the proposed paradigm is not limited to the described implementation method. In different implementations, a first step 410 includes a user posing a query to the system. In a second step 420, a plurality of perspectives is identified, while in a third step 430 these perspectives are ranked. In a fourth step 440, these ranked perspectives are shown to the user. The user selects the desired perspective(s) in a fifth step 450, and in a sixth step 460 the relevant documents to the query from the selected perspective(s) are retrieved and presented to the user.

For purposes of clarity to the reader, the method described above with respect to FIG. 4 is also represented graphically in the flow diagram of FIG. 5. As shown in the implementation of FIG. 5, a user 500 is shown submitting a query 510 to a retrieval system including a PBS engine 520. Though the user 500 is typically submitting queries at a computer station, it should be understood that the proposed method and system may be implemented with any search engine or information retrieval apparatus, including but not limited to computers, laptops, tablets, mobile devices, smart watches, and other information retrieval systems. The query 510 is transmitted within the PBS engine 520 to run a search 525 with a system component configured for retrieving perspectives 530. Once the corresponding perspectives for a query have been retrieved, they are sent to a system component configured for ranking perspectives 540. The results of this ranking provides a set of ranked perspectives, which are then presented to the user 500 as available perspectives 550 along with other "default perspectives" in some implementations. The user 500 is provided with an option of selecting a perspective 560 from the available perspectives 550. Once the at least one perspective is selected, the query is resubmitted to the PBS engine 520 along with the selected perspective(s) as a query+selected perspective 570. The PBS engine 520 runs another search 580, determines the relevant results based on the context of the perspective(s) selected, and retrieves a new, refined set of documents 590. These documents can be ranked and presented to the user, as shown schematically by a component 595. In other implementations, there may be additional steps and/or components, while in other implementations, one or more steps or components may be omitted.

In different implementations, the general structure of the proposed PBS paradigm can be substantially generic and not limited to any sets of perspective kinds. In some implementations, each viewpoint that leads to a different set of relevant results could be considered as a perspective. Therefore, in some applications, PBS can be used by defining the appropriate perspectives according to the particular needs of that application.

Figure 6:
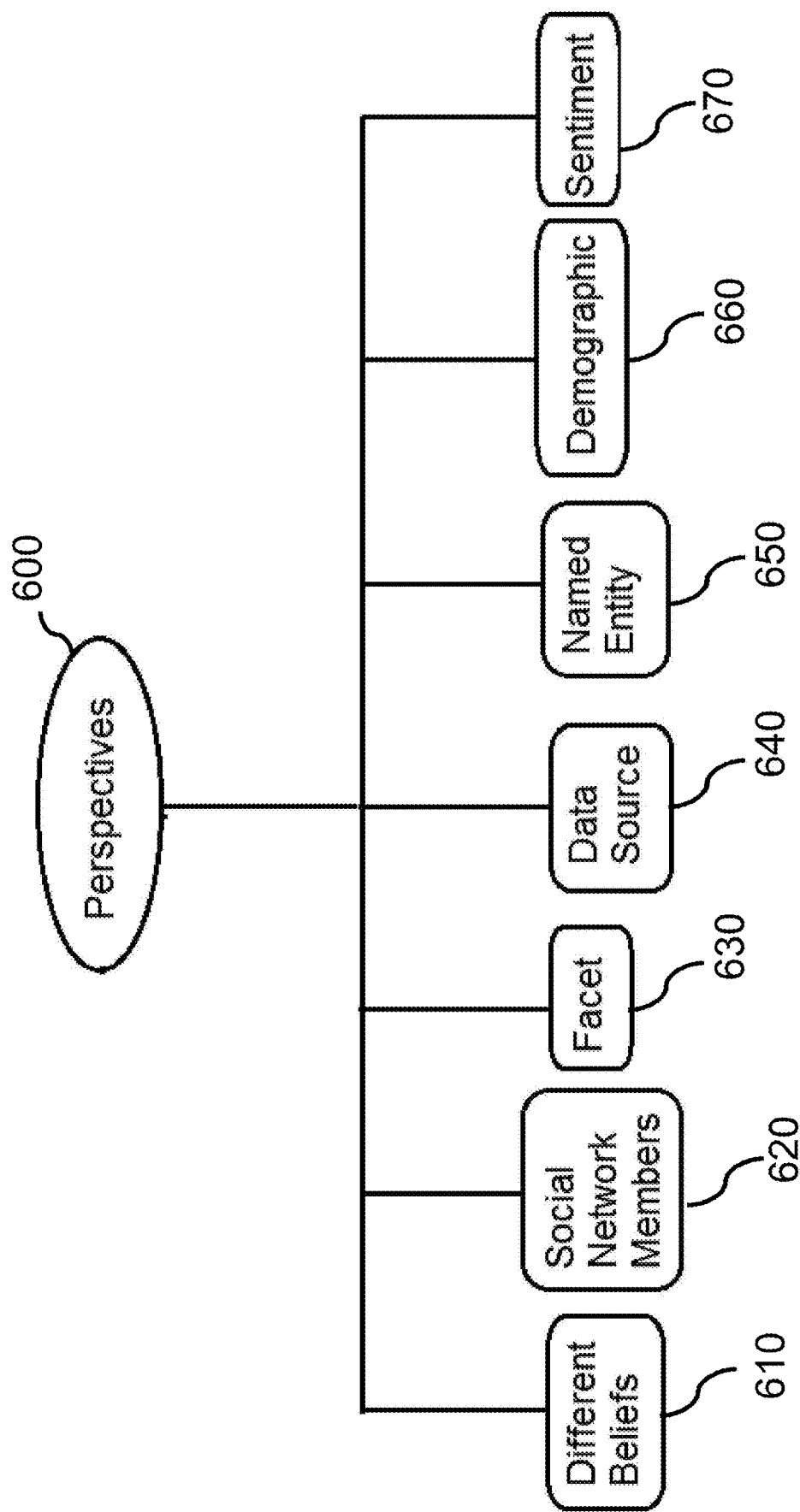
FIG. 6 is a schematic illustration of an implementation of various perspectives.

Thus, it should be understood that the perspectives available can be substantially limitless depending on the query and/or subject being searched. However, for purposes of example, FIG. 6 presents a set of perspectives 600. This set is presented for purposes of illustration only, and other implementations can include many other perspectives, or may omit one or more of the following perspectives.

As noted earlier with respect to the information bubble, in traditional information retrieval systems, users access the search results either from, a general perspective (non-personalized methods) or from their own perspective (personalized methods). Therefore, users are generally unable to view the searched topic from different perspectives or from a holistic point of view. In some cases, users are unable to identify the different perspectives available for the search topic.

In some implementations, the PBS system can apply a variety of perspectives. In the example of FIG. 6, the set of perspectives 600 includes seven types or categories of perspectives, including different beliefs perspective 610, social network members perspective 620, facet perspective 630, data source perspective 640, named entity perspective 650, demographic perspective 660, and sentiment perspective 670. Further detail regarding each of these perspectives will be provided below.

The different beliefs perspective 610 can encompass a wide range of positions associated with an individual's belief framework, including but not limited to religion, spirituality, or other beliefs. For example, if a user believes in a particular religion and/or a religion is dominant in the user's country, a personalized search system receiving a query related to religion may bias the results towards the user's own beliefs. In another example, the results may prioritize articles criticizing religions other than the user's religion. In some cases, this can limit the free and fair exchange of information, and possibly trap the individuals into a biased information bubble. Moreover, in these situations, formulating the queries that convey the user's real needs with the traditional personalized paradigm is challenging or even impossible. For example, if a user searches about critiques on their own religious beliefs, personalization techniques may bring up those results that confirm their own beliefs. On the other hand, if the user were able to view the different available perspectives on that topic in a categorized format, they would be able to receive results they are interested in and with less partiality about the searched topic.

In another example, an individual could submit a query regarding the attitudes of a country's political orientation about some topic. By including the country name in the query, the results from a conventional search engine would list information containing the country name, even though a page that describes a topic from a country's political viewpoint does not necessarily contain the country name. In order to address this kind of issue, PBS is configured to present different possible perspectives on the search topic to the user, allowing the user to choose the perspective desired. For example, a Russian may search about the "2014 Crimean crisis" and choose USA as the desired perspective through the use of PBS. Alternatively, an American may search about the "2014 Crimean crisis" and choose Russia as the desired perspective through PBS.

The social network members perspective 620 may also be available in some implementations of PBS. The social network members perspective 620 can permit a user to search from the viewpoint of a particular user (or group of users) in a social network. For example, if a user is interested in, the views of another individual and that individual's preferences, the user may elect to search a topic from this individual's 'personalized' point of view. In another example, the user may wish to see results reflecting what the user and those who are similar to her think about that particular topic. In yet another example, we can assume that in a social network for multimedia content a user's taste in movies is similar to that of another social network member. In this case, the user can use PBS to search the query "movie" and selecting the similar member as the perspective to obtain movies of interest to the social network member. In some implementations, these perspectives could be categorized or referred to as the social networks members perspective 620. Thus, a user can select a particulars social network member (or group of members) as the perspective.

Another advantage of the PBS paradigm is the possibility of simplifying the queries, which can help to mitigate query ambiguity. As an example, if an individual wants to see information relating to the attitude of the United States government regarding an international political issue, including words like "USA," "America" or "United States" in the query will eliminate many of the results that do not contain those specific words. Thus, documents written by American political experts not including those words will not be listed in the results. However, if the user enters a prominent American politician (for example, Barack Obama or U.S. politicians) as the selected perspective in PBS, the desired results would be more closely aligned with the original query, in contrast to traditional search engines.

In addition, providing this kind of perspective would not interfere with users' privacy, as PBS considers the public profile of the user, and not their private information. Moreover, in some implementations, users may enrich or supplement their profiles to help searchers better understand their beliefs when using PBS. As one example, a religious figure may add data and/or links to websites representing his or her beliefs and lifestyle to help the users view results from his or her perspective. In another example, a Jewish leader may add several kosher restaurants and shops to his profile so that a user who searches for a restaurant from his perspective can find those recommended kosher restaurants. Thus, in some implementations, PBS can provide an important media for publishing thoughts and lifestyles.

In another implementation, the facet perspective 630 allows the user to determine the facet or dimension that should be the focus of the results. For example, if the query is "Java" the user might expect to receive the download page of the Java runtime environment, information about the Java programming language, information about the Java coffee, and other such aspects of the term Java. However, PBS can provide these types of facet categories to the user, and allow the user to selects the desired facet, thereby producing user-defined relevant results.

In some implementations, the data source perspective 640 can also be available in the PBS system. As an example, if a user wants to see information related to the attitudes of the USA on a particular political or social topic, the user can choose a USA-related news agency (such as CNN or FOX News) as the perspective and obtain the results from that point-of-view. Alternatively, the user could select Xinhua (a Chinese news agency) as the perspective to retrieve the results from the viewpoint of China's government, or the BBC to retrieve results from the viewpoint of the UK. Thus, unlike traditional IR operators such as "site:" or "insite:" the PBS search results are not limited to the documents of the chosen data source; rather the data source is used by the PBS system as guidance for what the user actually intends to see. This allows the user to simply enter what he is searching for without sacrificing the retrieval recall. In contrast, to obtain the same results in a traditional system, the user should be familiar with the language and the set of words used in each of the perspectives. In addition, even if the user is familiar with the language, the queries might still be misleading. For example, if the user adds "USA" to the query, a traditional search engine would produce documents containing the term USA, while the intended results, i.e., results desired by the user including documents that are from the USA's perspective, might not be provided.

As another example, if a user is searching for a tutorial on AngularJS using the PBS-augmented search engine, the user could enter the query term "AngularJS" as well as a popular online learning website such as w3schools.com to retrieve the results biased towards tutorials and, references, rather than results including an AngularJS download page or the AngularJS homepage. It is important to note that the data source perspective 640 would not limit the results to the w3schools.com documents, and is primarily used to disambiguate the user's query.

In some implementations, the named entity perspective 650 category allows a user to receive results related to a specific entity. For example, a user may be planning a trip to Italy to visit the Juventus Football Club and the tourist attractions surrounding it. In a traditional search engine, in order to locate surrounding tourist attractions, the user may first need to find the name of the city that the Juventus Football Club is in (Turin). Furthermore, even when a user knows the name of the city and combines it with keywords such as "tourist attractions," he or she may not retrieve pages that do not contain the term "Turin" or the pages corresponding to the tourist attractions being outside Turin but close to it, which can reduce the retrieval effectiveness considerably. However, a PBS search engine would permit a user to enter Juventus as the perspective, and could result in a much higher retrieval relevance by, for example, retrieving the pages about the tourist attractions surrounding Juventus, but not necessarily in Turin, in the order of relevance to Juventus.

In different implementations, the demographic factors perspective 660 may also be applied as a perspective through the PBS system. A population of users each have different personalities, expertise, ages, language proficiencies, professions, income level, socioeconomic status, ethnicity, education, gender, marital status, and other demographic factors, and each demographic grouping can be associated with different views and information needs. By allowing the user to choose the demographic factor(s) themselves can optimize their search experience. For example, entering "a lawyer" as the perspective during a search for "abortion" may result in a distinctly different set of documents as compared to the general results provided for an "abortion" query.

As another example, entering "lack of proficiency in English" could allow the searcher to filter out the results with complex or higher English proficiency language. Similarly, in another example, entering "kids" or "child" as the perspective along with a query "poem" could allow a child or his/her parent to filter out adult-appropriate lyrics and find children's poems more readily.

In addition, in some implementations, PBS offers a relatively straightforward means of integrating sentiment perspective 670 into general-purpose search engines. For example, a user may be interested in purchasing a new cell phone and is browsing the internet to find the deficiencies associated with the "iPhone 5s" model. In a conventional search engine, to search for the relevant results, the user may need to use several keywords besides "iPhone 5s". In one case, the user may need to add keywords such as critique, malfunction, disadvantage, defect, or other such 'negative' terms to narrow the results, which is time-consuming and requires a detailed knowledge of the target language (here, English). However, with the same search query in PBS, the system could suggest a negative perspective with a label such as "Negative" to retrieve those types of results for the user.

Furthermore, it should be understood that in some implementations the sentiment perspective 670 or other perspective categories described herein can be combined with different perspectives to obtain a more fine-tuned set of results. For instance, a user may choose to perform a search with a mixture of perspectives, including a sentiment perspective such as the negative perspective, as well as a social networks members perspective such, as Larry Page's perspective (as a business competitor to Apple), in order to clarify the user's intentions.

Figure 7:
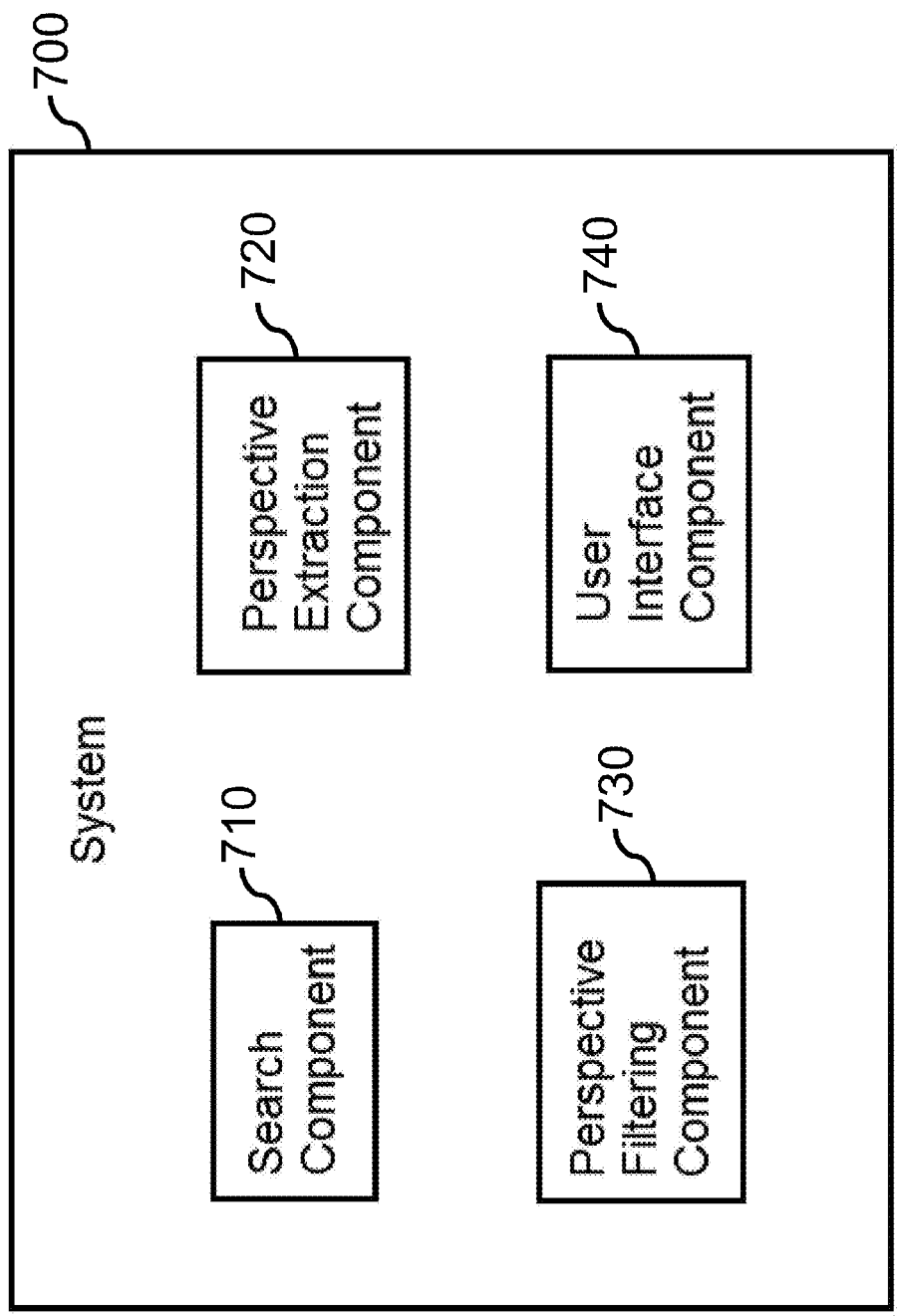
FIG. 7 is a schematic illustration of an implementation of components comprising a PBS system.

Referring now to FIG. 7, one implementation of an overview of components comprising a PBS system 700 is schematically illustrated. It should be understood that PBS system 700 provides a general paradigm for purposes of understanding. In other implementations, PBS system 700 can include additional components, or one or more of the depicted components can be omitted or exchanged for similar components. Thus, in different implementations, the PBS system can include a group of components that can be utilized to implement a PBS. In FIG. 7, the PBS system includes four core components, including a Search Component 710, a Perspective Extraction Component 720, a Perspective Filtering Component 730, and a User Interface Component 740.

As shown in FIG. 7, the Search Component 710 may be understood to include the main retrieval component of a PBS system. The functionality of the search component can be divided into two phases. In the initial phase, when the user issues a query, the search component is configured to retrieve the results for the user query, similar to that of a traditional search system. This retrieval can be either personalized or non-personalized. In a second phase, once the user has selected a perspective (or perspectives), the Search Component 710 is configured to retrieve the result for the user query and with respect to the selected perspective(s).

In one implementation of the second phase, the Search Component 710 can be configured to present only the webpages or information 'tagged' with the selected perspective to the user (or at least show them at the top of the results). Although this implementation may result in high precision for a user, the number of results may be small due to the paucity of the number of tagged pages, especially in the early stages of PBS system usage. As one alternative, currently available personalized retrieval methods can be exploited to implement the second phase. In other words, in some implementations, the selected perspective can at least partially correspond to the available background information of the user, and a personalized retrieval method is used to retrieve the results based on the combined information. In this case, the results can be biased towards the selected perspective and the documents from that perspective will be ranked higher in the results. In addition, in some implementations, personalized, search methods can be modified to rank documents from the selected perspective near the top of the results. For example, many personalized search methods combine a personalization score with a textual similarity score to obtain the final retrieval score. Therefore, in some implementations, by ranking the retrieved documents with a high personalization score at the top, documents that are expected to be related to that perspective are shown at the top of the results. As another alternative, currently available feedback methods (e.g., pseudo-relevance feedback) can be exploited to implement the second phase. In other words, feedback methods can be used to bias the results towards results that are associated with the selected perspective(s).

Some other possible implementations are described below. In one example, the system can consider the documents (all of them or only the retrieved ones) assigned to the selected perspective as a profile, and using available profile-based personalized retrieval methods to bias the results towards that perspective. In another example, the system can use centrality measures like Personalized PageRank and webgraph data with the documents assigned to the perspective as seed nodes or seed vectors to bias the scores toward that perspective, and reranking the search results accordingly. Using this technique for data source perspectives is of special interest because of its potential to take into account many pages of the data source as seeds. In a third example, the system can use a traditional social-network-based personalized search method, but apply a user (or group of users) other than the searching user for personalization. This technique is especially useful in social networks members perspectives and different beliefs perspectives. The searcher can simply choose another user to personalize the results based on that perspective. For a data source perspective, ranking higher the webpages from the websites having more in-links from or out-links to the selected data source can provide another approach. In addition, the system can utilize previously proposed methods for retrieval with respect to the perspective kinds (for example, faceted perspectives or sentiment perspective). As another example, the system can use document clustering or document similarity methods to infer the perspectives of the untagged webpages from the perspectives of the similar pages. The inferred perspectives can then be used in re-ranking the results. Furthermore, in some implementations, the system uses ontologies to infer the perspectives of the untagged webpages. The inferred perspectives can then be used in re-ranking the results. This technique would be applicable to all perspectives, in particular to the named entity perspective which is likely to be found in semantic networks. It should be understood that in different implementations one or more aspects of these techniques and search methods can be combined, for use by the system to retrieve the desired results.

It should further be understood that in some implementations, a retrieval operation is not required to produce only results from the selected perspective. Rather, the PBS system can be configured to bias the results towards that perspective, especially in the first stages of a PBS system. For example, when a traditional search engine retrieves the results for a query, it does not guarantee that every single result is relevant from the user's viewpoint (even at the present time, when search engines are much more mature than when they emerged). Instead, traditional search engines attempt to bias the top-retrieved documents towards what a user has queried and, by a feedback process, the traditional search engine can gradually learn and retrieve better results. In a similar fashion, in the PBS system, the results can be biased towards the selected perspective, and by collecting users' interactions logs, retrieval quality can be improved over time.

Referring again to FIG. 7, it can be seen that the system 700 includes the Perspective Extraction Component 720, responsible for identifying and categorizing perspectives in PBS. For example, the Perspective Extraction Component 720 can identify what types of viewpoints are available on the searched topic. In another example, the Perspective Extraction Component 720 is configured to explore a social network's users and suggest the pundits as perspectives. In some implementations where a commercial product is queried, the Perspective Extraction Component 720 can identify conflicting opinions and categorize positive and negative sentiments and suggest them as perspectives to the user.

In some implementations, the Perspective Extraction Component 720 may require two types of information. First, it needs access to the definitions of the perspectives (for example, Republican Party, Democratic Party, Green Party, and so forth). Second, the relevancy of each perspective to the search queried (for example, in a search for "gun control", the Republican Party would be a major relevant perspective for an American).

One means of collecting this information would be to employ user collaboration, crowd-sourcing, and other user-generated content (based on Web 2.0 principles), where the content is generated by the users rather than artificial intelligence. Therefore, to define a perspective, the system can employ web pages produced by user collaboration (such as Wikipedia), make use of concepts provided in concept networks like ConceptNet, and/or allow the users (that are possibly associated with a high reputation) to define perspectives. In our example, a reputable user can define a perspective labeled 'Republican Party', and possibly tags the Wikipedia link for the Republican Party as supplementary information.

Furthermore, to determine the perspectives that are relevant to a query, the system can again employ user-generated content. For example, a website can be provided in which each user can assign pre-defined perspectives to webpages. The perspectives assigned to the top retrieved webpages are then presented as perspective candidates for the query. However, in other implementations, other approaches may be used to determine relevance of perspectives. Other crowd-sourcing methods such as gamification and user-generated content can also be used.

In addition, for some of the proposed perspective kinds there are methods available for automatically extracting the perspectives and, reducing noise associated with user-generated content. For example, for facet perspectives and/or sentiment perspectives, currently available methods can be used for extracting the facets. Moreover, for some perspectives relevancy may be determined at least in part by the searcher rather than the search topic. For example, many of the demographic perspectives, like a 'children' perspective or 'low-proficiency in language' perspective, may be applicable to many of the user's searches. In some cases, extracting these perspectives is possible by keeping logs of previous perspectives selected by the user and extracting the most frequent ones. Thus, in some implementations, these perspectives can be considered as additional perspectives and be delivered to the next component to be filtered. Considering these user aspects as perspectives rather than rigid user profiles allows the user to manipulate or select them as desired. For example, a parent can select the children perspective when searching for something for their child, rather than for themselves. Furthermore, in another example, for the social networks members perspective, the system can automatically extract reputable users (for example, a user with a high number of followers) and/or those who have a rich profile on the search topic (for example, a user with many posts on the topic) as the candidate perspectives.

Moreover, as the PBS system develops over time and becomes increasingly widespread, further development of ontologies for the relations of topics and documents with perspectives could facilitate the search and/or produce more useful and exhaustive semantic and concept networks. For example, the system may use the information such as click-through data about the perspectives of the topics similar to (according to ontology) the searched topic to enrich its information about the perspectives of the searched topic. This can help reduce the sparseness problem. As an example of the use of a semantic network in PBS, referring back to the 'Juventus' example above, the system may not have any Juventus tags on tourist attractions webpages. However, the system can be configured to recognize that tourist attractions are places, and thus use the AtLocation relationship of the semantic network to find the city Juventus is located in (Turin). The name can then be implicitly used as the perspective and results are retrieved in accordance with this information.

As another example, referring back to the application of the 'Barack Obama' perspective in conjunction with the user-selected perspective 'USA,' when the user is searching about a political issue. Using the approach described above, the Barack Obama perspective is extracted according to a sematic network determining that Barack Obama was the president of the United States. The system can then retrieve pages tagged with the "Barack Obama" perspective but are not explicitly tagged with the "USA" perspective.

In addition, in some implementations, knowledge graphs can also be used in conjunction with the PBS system. Generally, knowledge graphs refer to a knowledge base used by some search engines to enhance the search engine's search results with semantic-search information gathered from a wide variety of sources. A PBS-based knowledge graph can add a perspective dimension to the knowledge graphs, which can help improve both search engines and knowledge graphs. Furthermore, website owners, website managers, and other content producers may employ markups and tagging to identify pages (or parts of pages) associated with particular perspectives. In other words, content producers may tag different parts of their websites with perspective tags, reflecting the relevancy of those perspectives. In some implementations, this approach can provide a robust source of information about perspectives.

The Perspective Filtering Component 730 is responsible for determining the importance of and filtering the perspectives extracted by the Perspective Extraction Component 720. In some cases, the Perspective Extraction Component 720 may extract a large number of relevant perspectives, and the Perspective Filtering Component 730 is configured to recognize the more relevant perspectives and provide these to the user via the User Interface Component 740. In one implementation, user-generated content can again be utilized to determine the importance of each perspective. For example, the number of times each perspective is assigned to the top retrieved webpages by users may provide an estimation of the importance of that perspective, and the system can rank them accordingly. In another example, the logs of users' interactions in similar searches, such as click-through data of similar searches, can be used to score the relevancy of the perspectives. In addition, in one implementation, perspectives that have been previously selected by the user (or possibly other users) can be prioritized. Moreover, similar to the perspective extraction component, ontologies can be used to enrich the perspective information and mitigate any sparseness.

In some cases, the perspectives defined by the website owners may be more precise and reliable than other perspective determinations; thus, prioritizing the perspectives that the content-producers themselves have provided or suggested can be another technique in ranking the perspectives.

The User Interface Component 740 is configured to provide an optimal user experience. The User Interface Component 740 includes a simple and comprehensible UI, imposing minimum intervention or distraction from the users' day-to-day search tasks. The type of perspectives displayed on the User Interface Component 740 can affect user adoption rates and utilization popularity of PBS. Generally, in most searches many perspectives of different types can be available. The presentation of all these perspectives could confuse and/or overwhelm the user, reducing the chance that the PBS system will be used. Thus, in some implementations, the Perspective Filtering Component 730 provides a discriminating filtering of the perspective categories that may be important in a successful PBS system.

Figure 8:
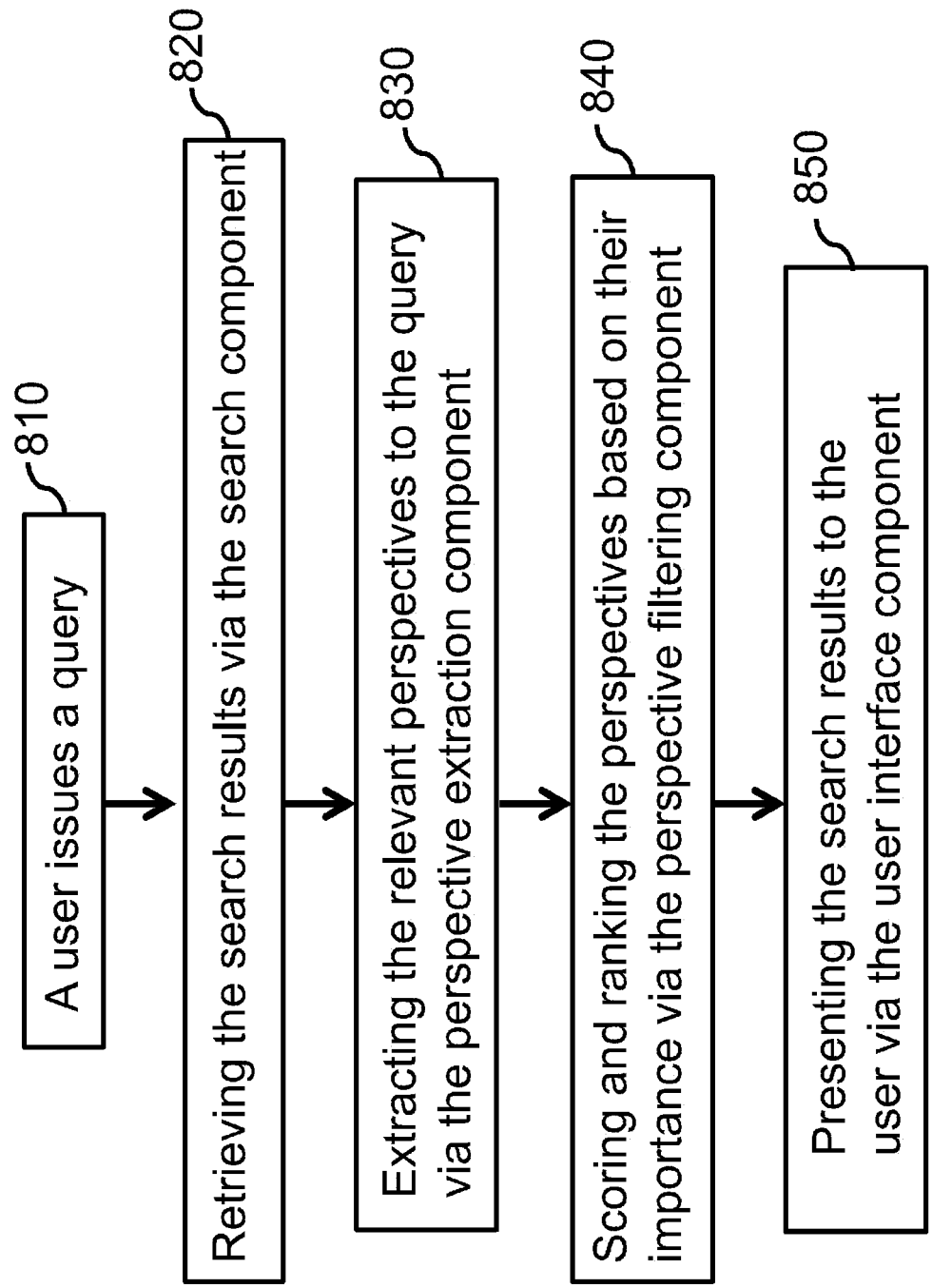
FIG. 8 is a flow chart illustrating an exemplary process for initiation of a retrieval operation in a PBS.
Figure 9:
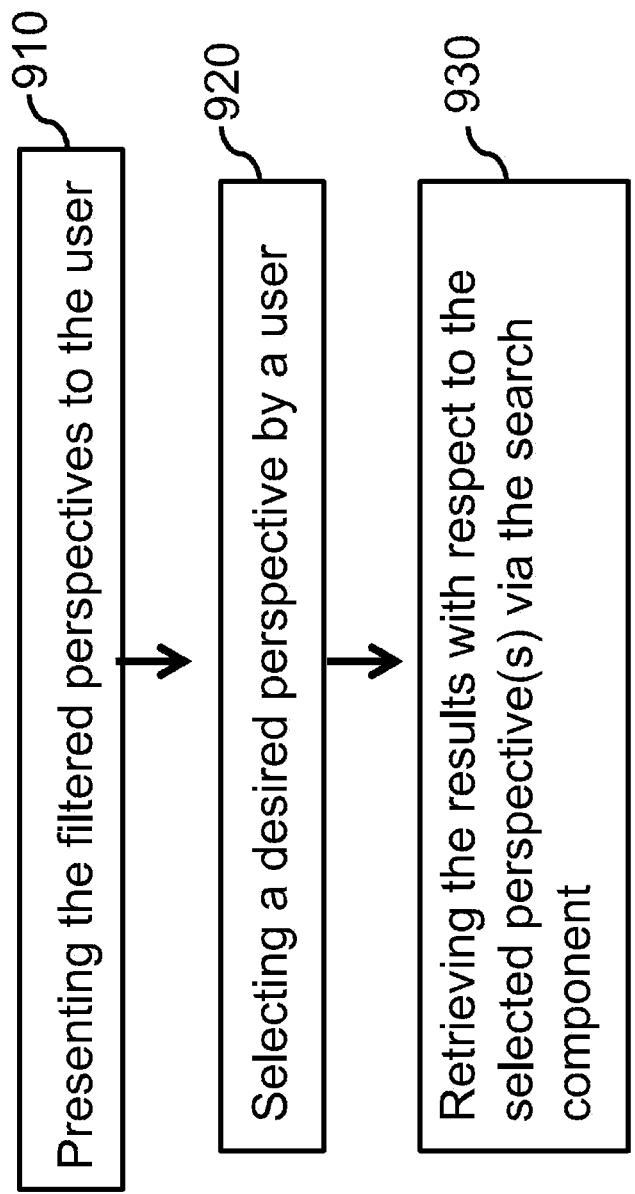
FIG. 9 is a flow chart illustrating an exemplary process of initiation of a PBS by a user.

Referring now to FIGS. 8 and 9, a more detailed illustration of two implementations of aspects of the PBS process is provided. FIG. 8 is a flow chart illustrating a method for initiation of a retrieval operation in a perspective based search. In different implementations, a first step 810 includes a user posing a query to the system. The search component then retrieves the search results (for example, as in a traditional search system) in a second step 820. In a third step 830 the perspective extraction component extracts the relevant perspectives to the query, and provides them to the next component. In a fourth step 840 the perspective filtering component scores and ranks perspectives based on their importance and then provides them to the user interface component. The user interface component then presents the search results to the user in a fifth step 850.

Referring now to FIG. 9, one implementation of a process of initiation of a perspective-based search by a user is illustrated. In a first step 910, the filtered perspectives (possibly together with the default search results) are presented to the user. In a second step 920, the user selects at least one of the filtered perspectives. In a third step 930, the search component presents the search results as ranked and screened by the selected perspective(s). In some other implementations, a user may be provided with the option of viewing additional perspectives beyond those initially shown. In addition, in some implementations, a user may be able to input text or other information to specify a perspective. In another implementation, the selection can include a presentation of various categories or kinds of perspectives to a user, a selection of which can lead to one or more additional selections to narrow the desired perspective. The process can be repeated or continued until the user finds the desired result(s). In other implementations, there may be additional steps and/or components with respect to these methods, while in other implementations, one or more steps or components may be omitted.

Figure 10:
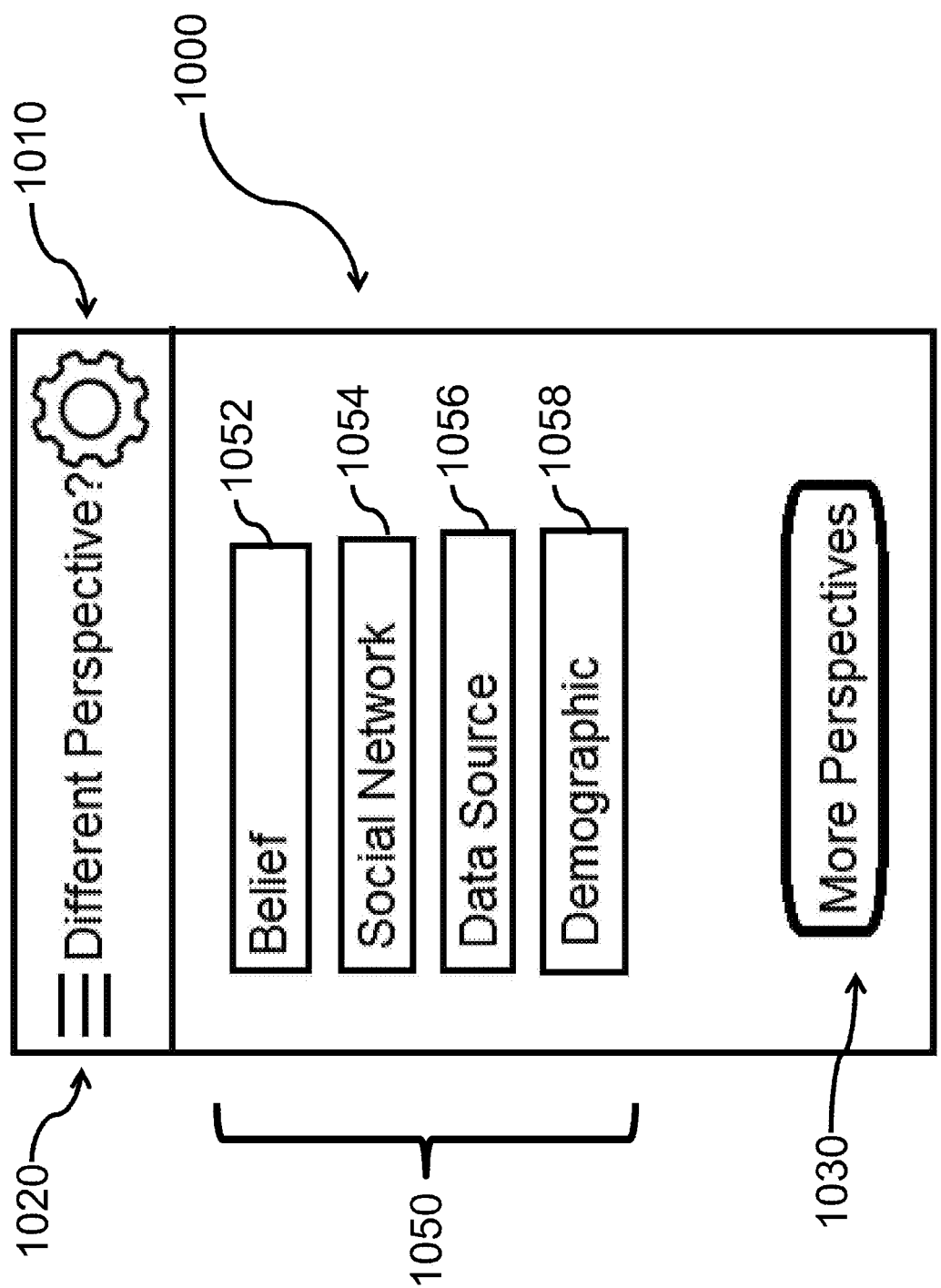
FIG. 10 illustrates an implementation of a PBS user interface.
Figure 11:
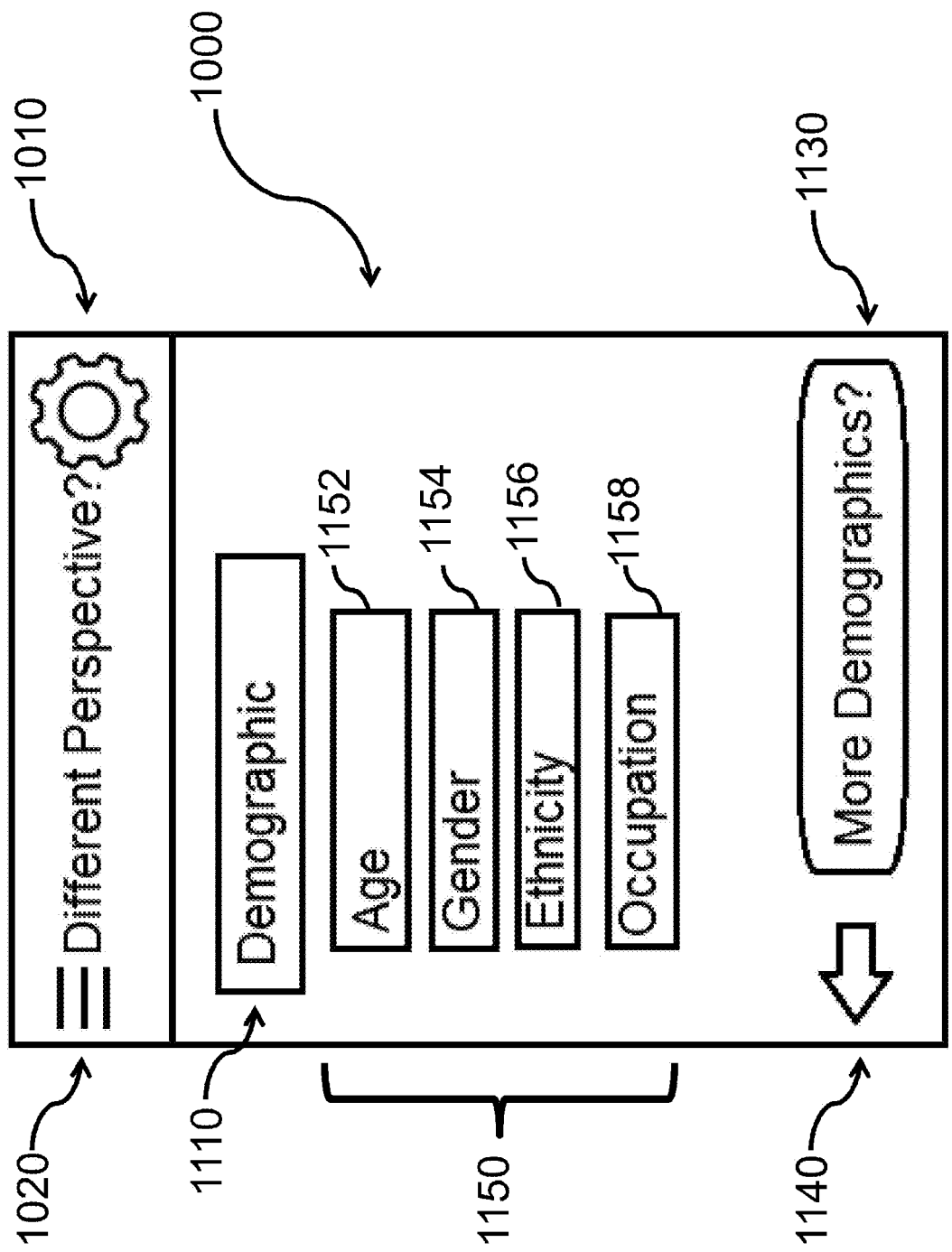
FIG. 11 illustrates another implementation of a PBS user interface.
Figure 12:
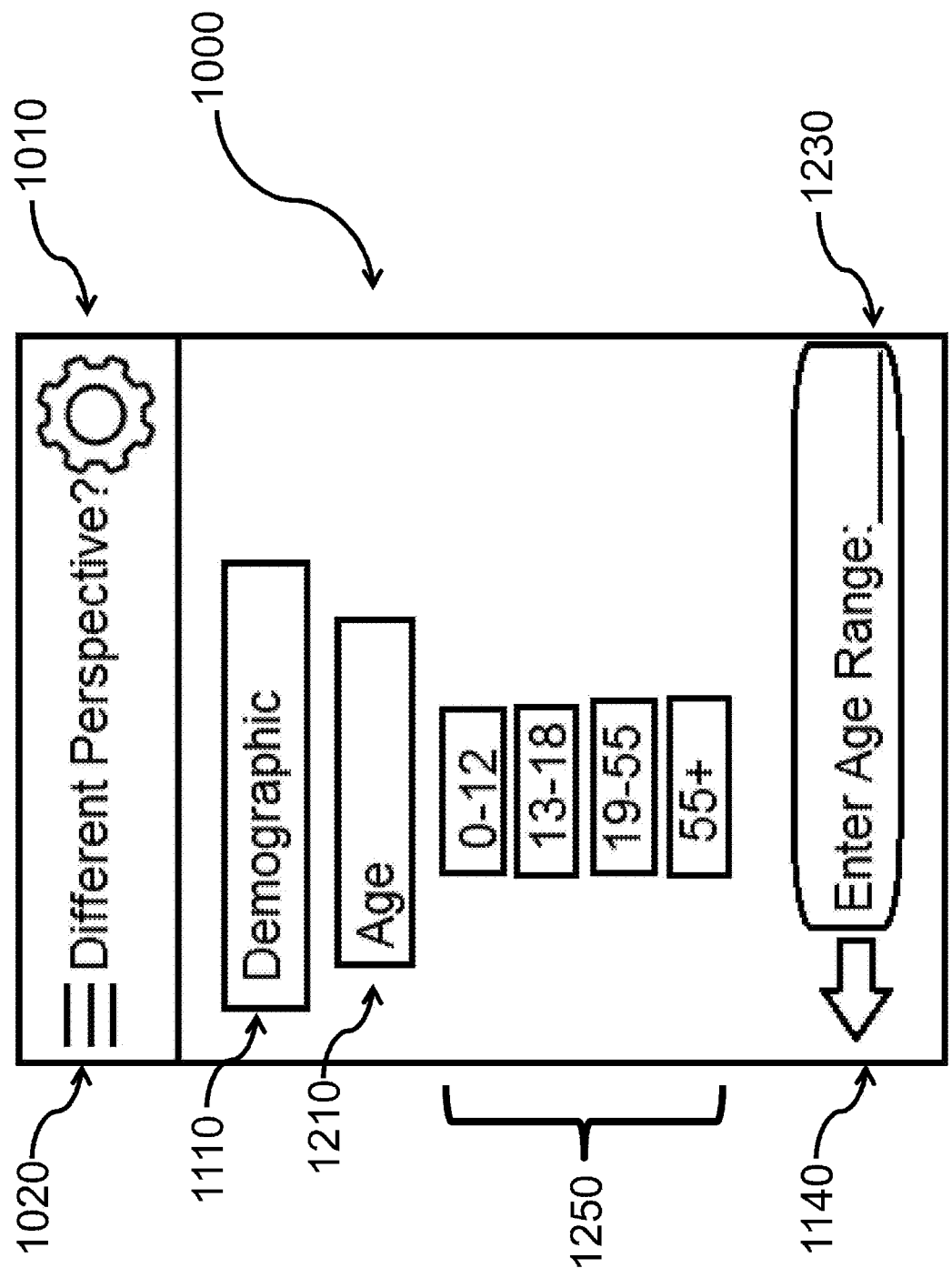
FIG. 12 illustrates another implementation of a PBS user interface.

To provide the reader with greater clarity of some of the proposed implementations, FIGS. 10-12 depict an example of a possible user interface 1000 that may be presented to a user. In FIG. 10, the user interface 1000 includes a menu with a list of clickable options. It should be understood that the text shown in the example of FIGS. 10-12 is provided for illustrative purposes only, and in other implementations, any other user interface designs, names, categories, identifiers, symbols, images, graphics, colors, font, and/or characters may be used in the user interface 1000.

In FIG. 10, the user interface 1000 includes a settings option 1010, a menu option 1020, a plurality of perspective categories 1050, and a More Perspectives option 1030. The settings option 1010 can allow a user to make changes to the interface, such as appearance settings (for example, font, size, placement, color, number of perspectives presented, button type, and other appearance settings), default settings, privacy settings, access settings, language settings, updates settings, sharing settings, sound settings, alert settings, notification settings, password or username settings, and other such application settings. In addition, the menu option 1020 can allow a user to access a history of previous searches and perspectives, adjust the perspectives to be considered, create an account for a different user, logout of the application, and other aspects that can allow a user to benefit from the PBS experience.

The plurality of perspective categories 1050 can also be displayed to a user. Generally, perspective categories 1050 are displayed once a user has submitted an initial search query and the process described above with respect to the retrieval operation can occur. In another implementation, a list of default perspective kinds can be displayed before a user has submitted a search query. Furthermore, in some implementations, the user interface 1000 is accessed by a user through a start button or download. In other implementations, the user interface 1000 may be displayed or available automatically when a search page is opened.

In FIG. 10, the perspective categories 1050 includes a first category 1052 ("Belief"), a second category 1054 ("Social Network"), a third category 1056 ("Data Source"), and a fourth category 1058 ("Demographic"). These are shown only as examples, and it should be understood that in other implementations any other perspective kinds can be displayed. In some implementations, a user may select a perspective by clicking, tapping, and/or using a keyboard shortcut that selects the corresponding button. Furthermore, in some implementations a user may view additional or alternate perspective categories by accessing the More Perspectives option 1030.

In FIG. 11, it can be assumed that the user has selected the fourth category 1058 ("Demographic") of FIG. 10, and the perspective category is now displayed as a first selected category 1110 near the top of the user interface 1000. In some implementations, the first selected category 1110 will be sufficient and the search engine will use the first selected category 1110 as the perspective filter to the search results. However, in other implementations, additional subcategories can be presented to a user. For example, in FIG. 11, below the primary category 1110, the user interface 1000 displays a plurality of secondary perspective categories or perspective subcategories, including a first subcategory 1152 ("Age"), a second subcategory 1154 ("Gender"), a third subcategory 1156 ("Ethnicity"), and a fourth subcategory 1158 ("Occupation"). Furthermore, in some implementations, there may be an option for accessing additional or alternate subcategories associated with the selected primary category, as shown with the "More Demographics?" option 1130. In addition, some implementations can include a "Back button" 1140 to allow the user to return to the previous level of categories.

Referring next to FIG. 12, it can be assumed that the user has selected the first subcategory 1152 ("Age") of FIG. 11, and the perspective subcategory is now displayed as a second selected category 1210 near the top of the user interface 1000, and below the first selected category 1110. In other implementations, the display may differ than what is shown in FIG. 12. In some implementations, the second selected category 1210 can be associated with a plurality of category subsets 1250, directly corresponding to the previously selected category. In FIG. 12, these are age ranges. In other implementations, the choices presented can include any feature, aspect, facet, characteristic, title, identifier, range, type, or category.

In one implementation, the user interface 1000 can offer the user an opportunity to enter the desired category through a text entry component 1230 to directly customize or self-select the perspective search.

Figure 13:
FIG. 13 illustrates an example of a web-based search.
Figure 14:
FIG. 14 illustrates an implementation of a PBS user interface with, a web based search.
Figure 15:
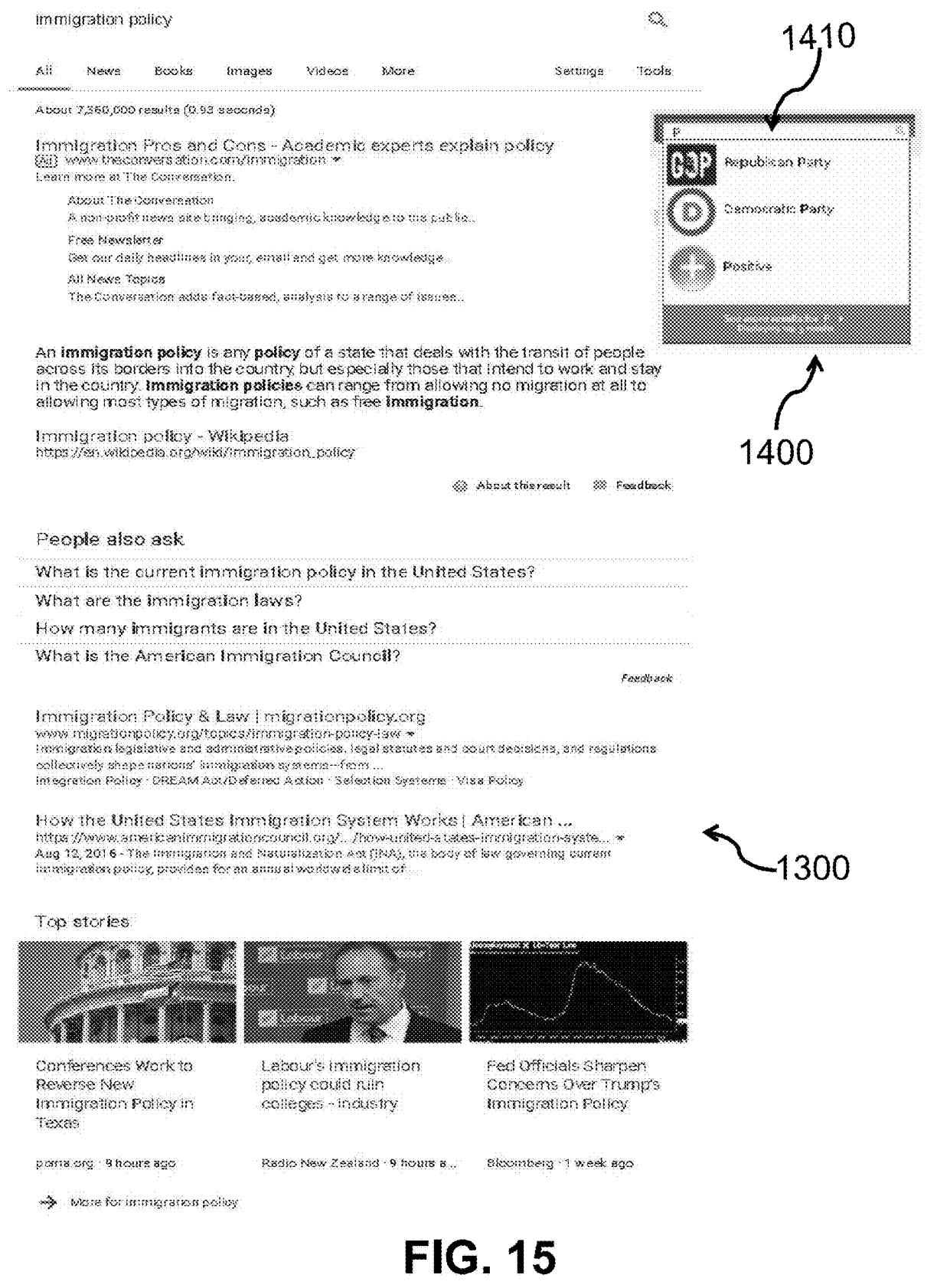

FIGS. 13-15 illustrate one possible implementation of a PBS user interface. It should be understood that the following figures are for illustrative purposes only, and the PBS paradigm described herein can be implemented in any other type of user interface associated with a webpage or information retrieval system. In FIG. 13, a generic search engine page is shown, with search results 1300 from a traditional search query on "immigration policy". In FIG. 14, the same webpage is shown, along with a PBS user interface 1400. The user interface 1400 offers the user the possibility of selecting a perspective that has been determined to have relevance to the searched topic. In this case, the Republican Party and the Democratic Party are presented as perspectives to the topic of immigration policy. In this representation, the default set of results may be personalized based on the user's profile or default. However, the user interface can allow a user to easily change the listed perspective.

In some implementations, by clicking or selecting a text box 1410 available for manual entry, the user can request a listing of particular perspectives. For example, in FIG. 14, the user can select or click on the text box 1410 and type a character(s) to request that the PBS system offer perspective categories related to the entered text. This is reflected in FIG. 15, where a third category (Positive perspective) has been added to the listing based on the text entry or partial query "P" into the text box 1410. In other implementations, a user can enter any other character into the text box to narrow or directly retrieve the desired perspective(s). Furthermore, as discussed above, the user may be able to access additional or alternative recommended perspectives by clicking on the More Perspectives option.

These types of options can help address issues where too many perspectives could be listed. In other words, the filtering problem can arise in a level higher than documents—thus, filtering the search perspectives themselves, rather than the documents, may be implemented to limit the number of perspectives presented to the user in order to facilitate the perspective selection. Furthermore, "More Perspectives" option can allow a user to view more perspectives presented in order of importance or relevance to the searched topic in some implementations. In some implementations, all of the possible perspectives can be ranked by the PBS system, and then be configured to provide only the most interesting or relevant perspectives to the user, rather than inundating the user with a deluge of perspectives.

Figure 16:
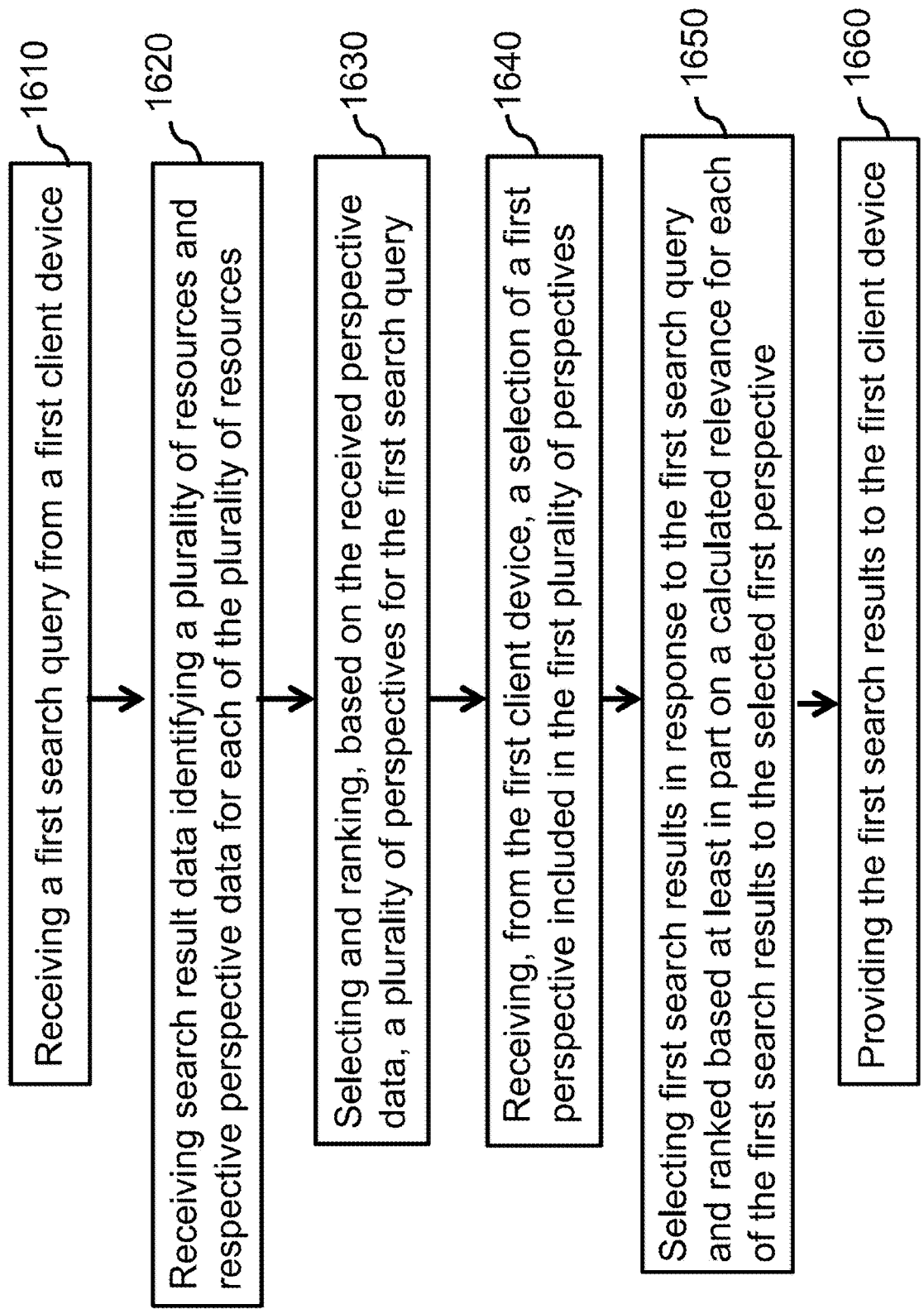
FIG. 16 is a flow chart illustrating an implementation of a PBS method.

Thus, in different implementations, the system can offer users many advantages, as described herein. For purposes of clarity, a flowchart depicting a method according to some implementations is provided in FIG. 16. As shown in FIG. 16, a first step 1610 includes receiving a first search query from a first client device. A second step 1620 includes receiving, in response to the first search query, search result data identifying a plurality of resources and respective perspective data for each of the plurality of resources. A third step 1630 includes selecting and ranking, based on the received perspective data, a plurality of perspectives for the first search query. In a fourth step 1640, a selection of a first perspective included in the first plurality of perspectives is received from the first client device. A fifth step 1650 includes selecting first search results in response to the first search query and ranked based at least in part on a calculated relevance for each of the first search results to the selected first perspective. Furthermore, a sixth step 1660 includes providing the first search results to the first client device.

In other implementations, the method can include additional steps. For example, in one implementation, the method can further include receiving crowd-sourced perspective information for one or more of the resources and generating the respective perspective data for each of the one or more of the resources based at least in part on the crowd-sourced perspective information. In another implementation, the method further includes determining the first client device is associated with a first user, wherein the selected perspective can at least partially correspond to available background information of the first user. In some implementations, the method also includes presenting, before the receiving of the selection of the first perspective, a subset of the plurality of perspectives for the first search query via the client device, where the first perspective is selected from the subset of the plurality of perspectives. In some cases, a second plurality of search results based on the first search result data is selected and presented in combination with the presentation of the subset of the plurality of perspectives before the receiving of the selection of the first perspective. In addition, in one implementation, the method further includes presenting, before the receiving of the selection of the first perspective, a first subset from the plurality of perspectives for the first search query via the first client device, presenting a user interface to be presented on the first client device, the user interface being configured to receive perspective query terms) (or sub-terms), receiving the perspective query term(s) (or sub-terms) from the first client device, selecting a second subset from the plurality of perspectives based at least upon the received perspective query term(s) (or sub-terms), and presenting the second subset via the first client device, where the first perspective is included in the second subset. In other cases, a user interface is provided that is configured to receive user identifications of one or more perspective associated with a resource. Furthermore, the method can include generating a second perspective based at least in part on social media information associated with a social media account, receiving a selection of the second perspective from a second client device, receiving a second search, query from the second client device, selecting second search results in response to the second query and ranked based at least in part on a calculated relevance value for each of the second search results to the second perspective. In some implementations, the method includes a step of determining the first client device is associated with a first user, where the ranking of the first plurality of perspectives is personalized according to the first user (e.g., by prioritizing one or more perspectives previously selected by the first user). In one implementation, a second perspective can be automatically identified as being related to the first perspective, where the ranking of the search results is further based at least in part on a calculated relevance for each of the search results to the identified second perspective.

It should be understood that each of these operations can be associated with a system including one or more computers and one or more storage devices. In one implementation, the one or more storage devices store instructions that, when executed by the one or more computers, cause the one or more computers to perform the aforementioned operations.

Figure 17:
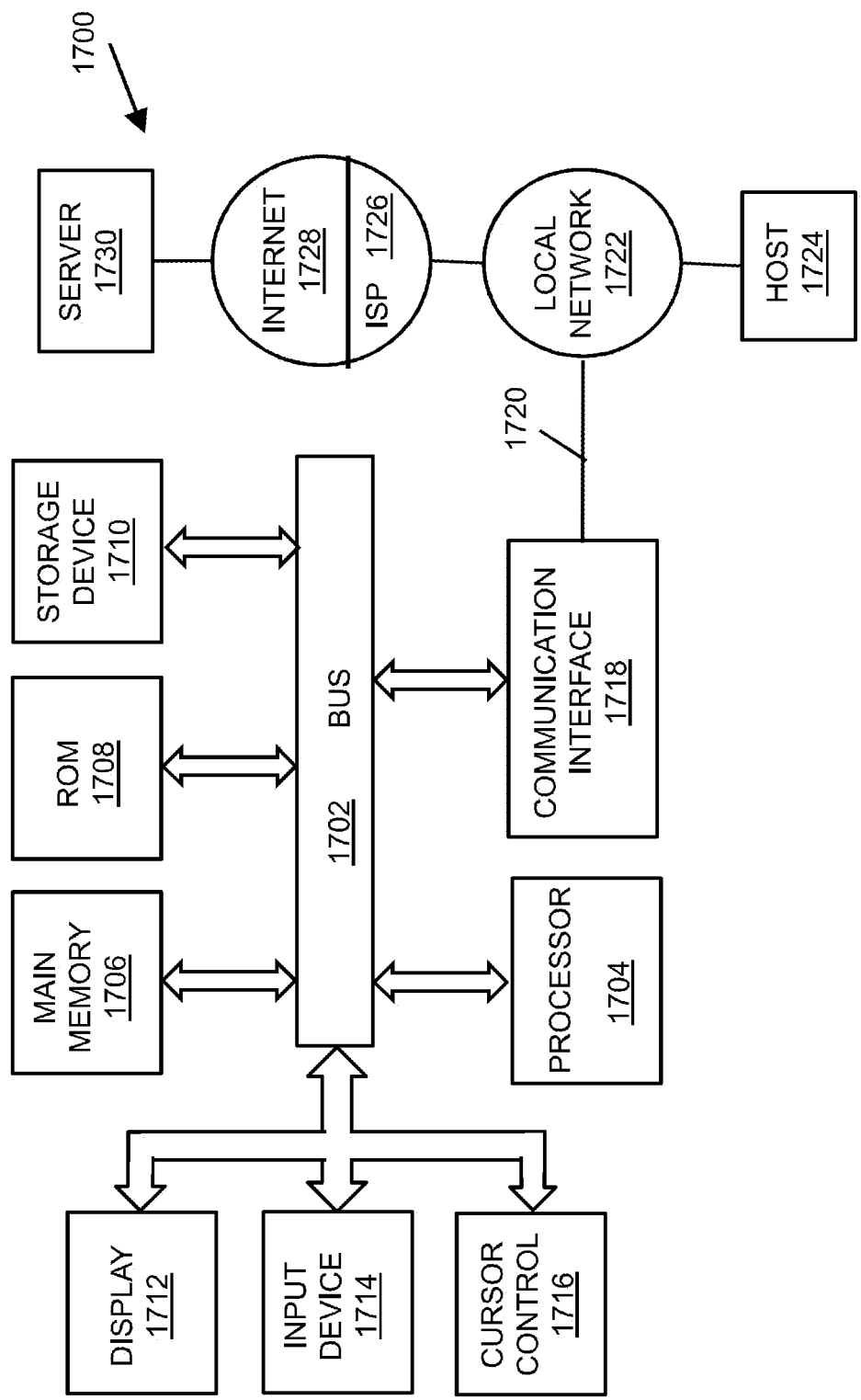
FIG. 17 is a block diagram showing an implementation of a computer system upon which aspects of a PBS is implemented.

FIG. 17 illustrates a block diagram showing a computer system 1700 upon which aspects of this disclosure may be implemented. Computer system 1700 includes a bus 1702 or other communication mechanism for communicating information, and a processor 1704 coupled with bus 1702 for processing information. Computer system 1700 also includes a main memory 1706, such as a random access memory (RAM) or other dynamic storage device, coupled to bus 1702 for storing information and instructions to be executed by processor 1704. Main memory 1706 also may be used for storing temporary variables or other intermediate information during execution of instructions to be executed by processor 1704.

The computer system 1700 can implement, for example, one or more of, or portions of the modules and other component blocks included in the PBS system 700 illustrated in FIG. 7. Examples can include, but are not limited to. Search Component 710, Perspective Extraction Component 720, Perspective Filtering Component 730, and User Interface Component 740.

The computer system 1700 can also implement, for example, one or more of, or portions of the operations illustrated in FIGS. 4, 8, 9, and 16. Examples can include, but are not limited to, the first step 410 of a user posing a query to the system, the second step 420 where a plurality of perspectives is identified, the third step 430 where these perspectives are ranked, the fourth step 440 where these ranked perspectives are shown to the user, the fifth step 450 where the user selects the desired perspective(s), and/or the sixth step 460 where the relevant documents to the query from the selected perspective(s) are retrieved and presented to the user, as illustrated in FIG. 4. Other examples include, but are not limited to, the operations of the first step 810 of a user posing a query to the system, the second step 820 where the search component retrieves the search results, the third step 830 in which the perspective extraction component extracts the relevant perspectives to the query, and provides them to the next component, the fourth step 840 where the perspective filtering component scores and ranks perspectives based on their importance and then provides them to the user interface component, and/or the fifth step 850 in which the user interface component presents the search results to the user, as illustrated in FIG. 8. Further examples include, but are not limited to, the operations of the first step 910 where the filtered perspectives are presented to the user, the second step 920 in which the user selects at least one of the filtered perspectives, and/or the third step 930, where the search component presents the search results as ranked and screened by the selected perspective(s), as illustrated in FIG. 9. In addition, the computer system can implement operations such as, for example, the first step 1610 of receiving a first search query from a first client device, the second step 1620 of receiving, in response to the first search query, search result data identifying a plurality of resources and respective perspective data for each of the plurality of resources, the third step 1630 of selecting and ranking, based on the received perspective data, a plurality of perspectives for the first search query, the fourth step 1640, where a selection of a first perspective included in the first plurality of perspectives is received from the first client device, the fifth step 1650 of selecting first search results in response to the first search query and ranked based at least in part on a calculated relevance for each of the first search results to the selected first perspective, and/or the sixth step 1660 of providing the first search results to the first client device, as illustrated in FIG. 16.

Computer system 1700 can further include a read only memory (ROM) 1708 or other static storage device coupled to bus 1702 for storing static information and instructions for processor 1704. A storage device 1710, such as a flash or other non-volatile memory can be coupled to bus 1702 for storing information and instructions.

Computer system 1700 may be coupled via bus 1702 to a display 1712, such as a liquid crystal display (LCD), for displaying or presenting information, for example, associated with the user interface, the search results, or the displayed perspectives. One or more user input devices, such as the example user input device 1714 can be coupled to bus 1702, and can be configured for receiving various user inputs, such as user command selections and communicating these to processor 1704, or to a main memoir 1706. The user input device 1714 can include physical structure, or virtual implementation, or both, providing user input modes or options, for controlling, for example, a cursor, visible to a user through display 1712 or through other techniques, and such modes or operations can include, for example virtual mouse, trackball, or cursor direction keys that may be used in conjunction with cursor control 1716.

The computer system 1700 can include respective resources of processor 1704 executing, in an overlapping or interleaved manner, multiple module-related instruction sets to provide a plurality of the modules illustrated in FIG. 7. For example, referring to FIGS. 7 and 17, Search Component 710, Perspective Extraction Component 720, Perspective Filtering Component 730, and User Interface Component 740 can be implemented as respective resources of the processor 1704 executing respective module instructions. Instructions may be read into main memory 1706 from another machine-readable medium, such as storage device 1710.

In some examples, hard-wired circuitry may be used in place of or in, combination with software instructions to implement one or more of the modules illustrated in FIG. 7, or to perform one or more portions of the operations illustrated in FIGS. 4, 8, 9, and 16, or both.

The term "machine-readable medium" as used herein refers to any medium that participates in providing data that causes a machine to operate in a specific fashion. Such a medium may take forms, including but not limited to, non-volatile media, volatile media, and transmission media. Non-volatile media can include, for example, optical or magnetic disks, such as storage device 1710. Transmission media can include optical paths, or electrical or acoustic signal propagation paths, and can include acoustic or light waves, such as those generated during radio-wave and infra-red data communications, that are capable of carrying instructions detectable by a physical mechanism for input to a machine.

Computer system 1700 can also include a communication interface 1718 coupled to bus 1702, for two-way data communication coupling to a network link 1720 connected to a local network 1722. Network link 1720 can provide data communication through one or more networks to other data devices. For example, network link 1720 may provide a connection through local network 1722 to a host computer 1724 or to data equipment operated by an Internet Service Provider (ISP) 1726 to access through the Internet 1728 a server 1730, for example, to obtain code for an application program.

The disclosed implementations can incorporate any of the features, components, methods, systems, software, and other aspects described in E. Pariser, The Filter Bubble: What the Internet Is Hiding from You, Penguin Group, 2011; W. Gross, T. McGovern and S. Colwell, "Personalized search engine". United States of America Patent 20050278317, 2005; A. Dridi, "Information Retrieval Framework based on Social Document Profile," in Proceedings of the Joint Proceedings of the CAiSE 2014 Forum and CAiSE 2014 Doctoral Consortium, 2014; F. Liu, C. Yu and W. Meng, "Personalized web search for improving retrieval effectiveness," IEEE Transactions on knowledge and data engineering, vol. 16, no. 1, pp. 28-40, 2004; Z. Ma, G. Pant and O. Sheng, "Interest-based personalized search," ACM Transactions on Information Systems, vol. 25, no. 1, pp. 245-250, 2007; J. Stracke Jr, "User control of search filter bubble". U.S. Pat. No. 8,886,644, 2014; M. Lee, D. Gemmell, A. Chandra, V. Vergonjeanne and E. Kleiman, "Adjusting search results based on user social profiles". United States of America Patent 20110320441, 2011; S. Chen, E. Kiciman and Y. Wang, "Customizing Search Results". United States of America Patent 20090164929, 2008; A. Maislos, R. Maislos and E. Arbel, "Apparatus and computer code for providing social-network dependent information retrieval services". United States of America Patent 20080103907, 2008; D. Tunkelang, "Faceted Search," Synthesis Lectures on Information Concepts, Retrieval, and Services, vol. 1, no. 1, pp. 1-80, 2009; J. Koren, Y. Zhang and X. Liu, "Personalized interactive faceted search," in Proceedings of the 17th international conference on World Wide Web, 2008; O. Ben-Yitzhak, N. Golbandi, N. Har'El, R. Lempel, A. Neumann, S. Ofek-Koifman, D. Sheinwald, E. Shekita, B. Sznajder and S. Yogev, "Beyond basic faceted search," in Proceedings of the 2008 International Conference on Web Search and Data Mining, 2008; W. Zheng and H. Fang, "A Retrieval System based on Sentiment Analysis," in The Fourth Workshop on Human-Computer Interaction and Information Retrieval, 2010; C. R. Sunstein, Republic.com 2.0, Princeton University Press, 2007; C. R. Sunstein, Echo Chambers: Bush V, Gore, Impeachment, and Beyond, Princeton University Press, 2001; D. Frey, "Recent Research on Selective Exposure to Information," Advances in Experimental Social Psychology, vol. 19, pp. 41-80, 1986; D. O. Sears and J. L. Freedman, "Selective Exposure To Information: A Critical Review," Public Opinion Quarterly, vol. 31, no. 2, 1967; M. McPherson, L. Smith-Lovin and J. M. Cook. "Birds of a Feather: Homophily in Social Networks," Annual Review of Sociology, vol. 27, no. 1, pp. 415-444, 2001; E, Yom-Tov, S. Dumais and Q. Guo, "Promoting Civil Discourse Through Search Engine Diversity," Social Science Computer Review, vol. 32, no. 2. pp. 145-154, 2014; C. R. Sunstein. Going to Extremes: How Like Minds Unite and Divide, Oxford University Press, 2009; R. K. Garrett and P. Resnick, "Resisting Political Fragmentation on the Internet," Daedalus, vol. 140, no. 3, pp. 108-120, 2011; L. v. Ahn, "Games with a Purpose," Computer, vol. 39. no. 6, pp. 92-94, 2006: J. Teevan, S. T. Dumais and E. Horvitz. "Personalizing Search via Automated Analysis of Interests and Activities," in Proceedings of the 28th Annual International ACM SIGIR Conference on Research and Development, in Information Retrieval, 2005; R. Mehrotra and E. Yilmaz, "Terms, Topics & Tasks: Enhanced User Modelling for Better Personalization," in Proceedings of the 2015 International Conference on The Theory of Information Retrieval, 2015; S. Brin and L. Page, "The anatomy of a large-scale hypertextual Web search engine," in Proceedings of the 7th International Conference on World Wide Web, 1998; L. Gou, H. Chen, J. Kim, X. Zhang and C. L. Giles, "SNDocRank: document ranking based on social networks," in Proceedings of the 19th international conference on World Wide Web, 2010; and H. Li, "Learning to Rank for Information Retrieval and Natural Language Processing," Synthesis Lectures on Human Language Technologies, vol. 4, no. 1, pp. 1-113, 2011, each of which is incorporated by reference herein in their entireties.

As disclosed herein, the perspective-based search system allows the users to benefit from advantages of personalization without sacrificing a fairness and comprehensiveness of the results. PBS can also help to establish a free and fair flow of information among individuals, which has been hindered by the virtual borders of information bubbles.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A system comprising:
   one or more computers; and
   one or more storage devices, the one or more storage devices storing instructions that, when executed by the one or more computers, cause the one or more computers to perform operations including:
   receiving a first search query from a first client device;
   receiving, in response to the first search query, search result data identifying a plurality of resources and respective perspective data for each of the plurality of resources;
   selecting and ranking, based on the received perspective data, a plurality of perspectives for the first search query, the plurality of perspectives comprising:
      a different beliefs perspective comprising a range of positions associated with a belief framework of an individual;
      a social network members perspective comprising a viewpoint of a member of a social network;
      a facet perspective comprising a facet of the first search query;
      a data source perspective comprising a viewpoint of a resource of the plurality of resources;

a named entity perspective comprising a name of an entity associated with the first search query;
a demographic factors perspective comprising a demographic factor of at least one person of a population, the demographic factor comprising at least one of a personality, an expertise, an age, a language proficiency, a profession, an income level, a socioeconomic status, an ethnicity, an education, a gender, a marital status, or combinations thereof; and
a sentiment perspective comprising one of a negative sentiment and a positive sentiment;
receiving, from the first client device, a selection of a first perspective included in the first plurality of perspectives;
selecting first search results in response to the first search query and ranked based at least in part on a calculated relevance for each of the first search results to the selected first perspective; and
providing the first search results to the first client device.

2. The system of claim 1, wherein the instructions further cause the one or more computers to perform operations comprising:
receiving crowd-sourced perspective information for one or more of the plurality of resources;
receiving semantic perspective information for the one or more of the plurality of resources from a semantic network associated with the one or more of the plurality of resources;
receiving knowledge perspective information for the one or more of the plurality of resources from a knowledge graph associated with the one or more of the plurality of resources; and
generating the respective perspective data for each of the one or more of the plurality of resources based at least in part on one or more of the crowd-sourced perspective information, the semantic perspective information, and the knowledge perspective information.

3. The system of claim 1, wherein the instructions further cause the one or more computers to perform operations comprising determining the first client device is associated with one of a first user or a second user different from the first user, wherein the selected perspective can at least partially correspond to available background information of the first user.

4. The system of claim 1, wherein the instructions further cause the one or more computers to perform operations comprising:
presenting, before the receiving of the selection of the first perspective, a subset of the plurality of perspectives for the first search query via the client device; and
biasing the first search results toward the first perspective utilizing one or more of a feedback method, a profile-based personalized retrieval method, or a centrality measure;
wherein the first perspective is selected from the subset of the plurality of perspectives.

5. The system of claim 4, wherein the instructions further cause the one or more computers to perform operations comprising:
selecting a second plurality of search results based on the first search result data; and
presenting, before the receiving of the selection of the first perspective, the second plurality of search results in combination with the presentation of the subset of the plurality of perspectives.

6. The system of claim 1, wherein the instructions further cause the one or more computers to perform operations comprising:
presenting, before the receiving of the selection of the first perspective, a first subset from the plurality of perspectives for the first search query via the first client device;
presenting a user interface to be presented on the first client device, the user interface being configured to receive a perspective query term;
receiving the perspective query term from the first client device;
selecting a second subset from the plurality of perspectives based at least upon the received perspective query term; and
presenting the second subset via the first client device, wherein the first perspective is included in the second subset.

7. The system of claim 2, wherein the instructions further cause the one or more computers to perform operations comprising providing a user interface configured to receive user identifications of one or more perspective associated with a resource.

8. The system of claim 1, wherein the instructions further cause the one or more computers to perform operations comprising:
generating a second perspective based at least in part on social media information associated with a social media account;
receiving a selection of the second perspective from a second client device;
receiving a second search query from the second client device; and
selecting second search results in response to the second query and ranked based at least in part on a calculated relevance value for each of the second search results to the second perspective.

9. The system of claim 1, wherein the instructions further cause the one or more computers to perform operations comprising:
determining the first client device is associated with a first user,
wherein the ranking of the first plurality of perspectives includes prioritizing one or more perspectives previously selected by the first user.

10. The system of claim 1, wherein the instructions further cause the one or more computers to perform operations comprising automatically identifying a second perspective as being related to the first perspective, wherein the ranking of the search results is further based at least in part on a calculated relevance for each of the search results to the identified second perspective.

11. A method comprising:
receiving a first search query from a first client device;
receiving, in response to the first search query, search result data identifying a plurality of resources and respective perspective data for each of the plurality of resources;
selecting and ranking, based on the received perspective data, a plurality of perspectives for the first search query, the plurality of perspectives comprising:
a different beliefs perspective comprising a range of positions associated with a belief framework of an individual;
a social network members perspective comprising a viewpoint of a member of a social network;
a facet perspective comprising a facet of the first search query;

a data source perspective comprising a viewpoint of a resource of the plurality of resources;

a named entity perspective comprising a name of an entity associated with the first search query;

a demographic factors perspective comprising a demographic factor of at least one person of a population, the demographic factor including at least one of a personality, an expertise, an age, a language proficiency, a profession, an income level, a socioeconomic status, an ethnicity, an education, a gender, a marital status, or combinations thereof; and a sentiment perspective comprising one of a negative sentiment and a positive sentiment;

receiving, from the first client device, a selection of a first perspective included in the first plurality of perspectives;

selecting first search results in response to the first search query and ranked based at least in part on a calculated relevance for each of the first search results to the selected first perspective; and providing the first search results to the first client device.

12. The method of claim 11, further comprising:
receiving crowd-sourced perspective information for one or more of the plurality of resources;

receiving semantic perspective information for the one or more of the plurality of resources from a semantic network associated with the one or more of the plurality of resources;

receiving knowledge perspective information for the one or more of the plurality of resources from a knowledge graph associated with the one or more of the plurality of resources; and generating the respective perspective data for each of the one or more of the plurality of resources based at least in part on one or more of the crowd-sourced perspective information, the semantic perspective information, and the knowledge perspective information.

13. The method of claim 11, further comprising determining the first client device is associated with one of a first user or a second user different from the first user, wherein the selected perspective can at least partially correspond to available background information of the first user.

14. The method of claim 11, further comprising:
presenting, before the receiving of the selection of the first perspective, a subset of the plurality of perspectives for the first search query via the client device; and biasing the first search results toward the first perspective utilizing one or more of a feedback method, a profile-based personalized retrieval method, or a centrality measure;

wherein the first perspective is selected from the subset of the plurality of perspectives.

15. The method of claim 14, further comprising:
selecting a second plurality of search results based on the first search result data; and presenting, before the receiving of the selection of the first perspective, the second plurality of search results in combination with the presentation of the subset of the plurality of perspectives.

16. The method of claim 11, further comprising:
presenting, before the receiving of the selection of the first perspective, a first subset from the plurality of perspectives for the first search query via the first client device;

presenting a user interface to be presented on the first client device, the user interface being configured to receive a perspective query term;

receiving the perspective query term from the first client device;

selecting a second subset from the plurality of perspectives based at least upon the received perspective query term; and presenting the second subset via the first client device, wherein the first perspective is included in the second subset.

17. The method of claim 12, further comprising providing a user interface configured to receive user identifications of one or more perspective associated with a resource.

18. The method of claim 11, further comprising:
generating a second perspective based at least in part on social media information associated with a social media account;

receiving a selection of the second perspective from a second client device;

receiving a second search query from the second client device; and selecting second search results in response to the second query and ranked based at least in part on a calculated relevance value for each of the second search results to the second perspective.

19. The method of claim 11, further comprising:
determining the first client device is associated with a first user, wherein the ranking of the first plurality of perspectives includes prioritizing one or more perspectives previously selected by the first user.

20. The method of claim 11, further comprising:
automatically identifying a second perspective as being related to the first perspective, wherein the ranking of the search results is further based at least in part on a calculated relevance for each of the search results to the identified second perspective.

* * * * *